(12) United States Patent
Johnson et al.

(10) Patent No.: US 12,357,085 B2
(45) Date of Patent: *Jul. 15, 2025

(54) TABLE

(71) Applicant: LIFETIME PRODUCTS, INC., Clearfield, UT (US)

(72) Inventors: Mitch Johnson, South Weber, UT (US); Kevin Boydston, Clinton, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,046

(22) Filed: Aug. 21, 2023

(65) Prior Publication Data

US 2023/0389694 A1  Dec. 7, 2023

Related U.S. Application Data

(63) Continuation of application No. 16/243,993, filed on Jan. 9, 2019, now Pat. No. 11,730,262.

(51) Int. Cl.
*A47B 13/08* (2006.01)
*A47B 3/00* (2006.01)
(Continued)

(52) U.S. Cl.
CPC ............... *A47B 13/083* (2013.01); *A47B 3/00* (2013.01); *A47B 3/087* (2013.01); *A47B 13/003* (2013.01);
(Continued)

(58) Field of Classification Search
CPC ..... A47B 13/083; A47B 13/003; A47B 13/08; A47B 13/085; A47B 3/00; A47B 3/087;
(Continued)

(56) References Cited

U.S. PATENT DOCUMENTS 2,223,193 A   11/1940   Tafel
2,871,076 A   1/1959   Mell
(Continued)

FOREIGN PATENT DOCUMENTS

CN   201961377 U   9/2011
EP   3372113 A1   9/2018
WO   2017045579 A1   3/2017

OTHER PUBLICATIONS

International Preliminary Report, as issued in connection with International Patent Application No. Application No. PCT/US202/0012979, dated Jul. 22, 2021, 7 pgs.
(Continued)

*Primary Examiner* — Daniel J Troy
*Assistant Examiner* — Timothy M Ayres
(74) *Attorney, Agent, or Firm* — Maschoff Brennan

(57) ABSTRACT

A molded plastic structure may comprise a tabletop with an upper surface and a lower surface. A lip may extend downwardly relative to the lower surface of the tabletop, and the lip may include an outer surface and an inner surface. An inwardly extending portion may extend inwardly from the inner surface of the lip. A frame may be connected to the tabletop and the frame may include a side rail of a frame. The side rail may include a receiving portion that receives the inwardly extending portion. The side rail may also include a portion that supports the lower surface of the tabletop and a portion that supports the lip.

20 Claims, 14 Drawing Sheets

(51) Int. Cl.
*A47B 3/087* (2006.01)
*A47B 13/00* (2006.01)
*B29C 49/42* (2006.01)

(52) U.S. Cl.
CPC ... *B29C 49/42811* (2022.05); *A47B 2013/085* (2013.01)

(58) Field of Classification Search
CPC .............. A47B 2013/085; B29C 49/00; B29C 49/0005; B29C 49/42
USPC ......................................................... 108/129
See application file for complete search history.

(56) References Cited

U.S. PATENT DOCUMENTS

| | | |
|---|---|---|
| 3,368,504 A | 2/1968 | Boris |
| 4,727,816 A | 3/1988 | Virtue |
| 4,911,085 A | 3/1990 | Pencoske |
| 5,921,623 A | 7/1999 | Nye |
| D414,626 S | 10/1999 | Collins |
| D417,354 S | 12/1999 | Valenti |
| 6,000,345 A | 12/1999 | Gillotti |
| D442,788 S | 5/2001 | Nye |
| 6,334,400 B1 | 1/2002 | Nien |
| 6,347,831 B1 | 2/2002 | Nye |
| D468,135 S | 1/2003 | Ashby |
| D468,139 S | 1/2003 | Strong |
| 6,508,184 B1 | 1/2003 | Winter |
| D469,994 S | 2/2003 | Smith |
| D470,352 S | 2/2003 | Strong |
| D470,693 S | 2/2003 | Strong |
| D473,450 S | 4/2003 | Strong |
| D479,778 S | 9/2003 | Haney |
| D485,100 S | 1/2004 | Ashby |
| D486,190 S | 2/2004 | Winter |
| D486,329 S | 2/2004 | Strong |
| D487,855 S | 3/2004 | Nye |
| D489,553 S | 5/2004 | Haney |
| D489,557 S | 5/2004 | Strong |
| D489,922 S | 5/2004 | Choi |
| D490,261 S | 5/2004 | Astle |
| D493,310 S | 7/2004 | Ashby |
| D494,784 S | 8/2004 | Strong |
| D495,909 S | 9/2004 | Astle |
| D497,746 S | 11/2004 | Haney |
| D498,091 S | 11/2004 | Winter |
| D498,622 S | 11/2004 | Neunzert |
| D498,953 S | 11/2004 | Strong |
| 6,817,662 B2 | 11/2004 | Winter |
| D499,283 S | 12/2004 | Winter |
| D502,028 S | 2/2005 | Ashby |
| D506,631 S | 6/2005 | Astle |
| 6,901,867 B2 | 6/2005 | Strong |
| 6,905,166 B2 | 6/2005 | Zhurong |
| D507,132 S | 7/2005 | Astle |
| D507,435 S | 7/2005 | Astle |
| D509,386 S | 9/2005 | Haney |
| D511,259 S | 11/2005 | Winter |
| D511,417 S | 11/2005 | Astle |
| D511,637 S | 11/2005 | Strong |
| D511,913 S | 11/2005 | Kearl |
| 6,968,789 B2 | 11/2005 | Baik |
| D513,140 S | 12/2005 | Strong |
| 6,971,321 B1 | 12/2005 | Strong |
| D515,852 S | 2/2006 | Strong |
| 7,036,437 B2 | 5/2006 | Choi |
| 7,051,662 B2 | 5/2006 | Shenghao |
| 7,055,899 B2 | 6/2006 | Zhurong |
| 7,059,254 B2 | 6/2006 | Strong |
| 7,069,865 B2 | 7/2006 | Strong et al. |
| 7,096,799 B2 | 8/2006 | Strong |
| D527,930 S | 9/2006 | Aslle |
| 7,100,518 B2 | 9/2006 | Strong |
| 7,111,563 B2 | 9/2006 | Strong |
| D529,734 S | 10/2006 | Astle |
| D535,552 S | 1/2007 | Neunzert |
| 7,171,910 B2 | 2/2007 | Strong et al. |
| 7,178,468 B2 | 2/2007 | Winter |
| 7,178,471 B2 | 2/2007 | Strong |
| 7,197,988 B2 | 4/2007 | Degen |
| 7,263,932 B2 | 9/2007 | Winter |
| 7,278,361 B2 | 10/2007 | Zhurong |
| 7,299,753 B2 | 11/2007 | Strong |
| 7,299,754 B2 | 11/2007 | Stanford |
| 7,331,297 B2 | 2/2008 | Strong |
| D575,083 S | 8/2008 | Lin |
| 7,428,872 B2 | 9/2008 | Strong |
| 7,461,601 B2 | 12/2008 | Jin |
| 7,469,646 B2 | 12/2008 | Baik |
| 7,475,640 B2 | 1/2009 | Winter |
| 7,475,641 B2 | 1/2009 | Jin |
| 7,475,642 B2 | 1/2009 | Shenghao |
| 7,634,969 B2 | 12/2009 | Neunzert |
| 7,735,431 B2 | 6/2010 | Neunzert |
| 7,735,915 B2 | 6/2010 | Nye |
| D619,831 S | 7/2010 | Branch |
| 7,757,617 B2 | 7/2010 | Larcom |
| 7,814,844 B2 | 10/2010 | Haney |
| 7,849,789 B1 | 12/2010 | Whelan |
| 7,905,185 B2 | 3/2011 | Peery et al. |
| D640,487 S | 6/2011 | Bennett |
| 7,971,930 B2 | 7/2011 | Larsen |
| 7,975,625 B2 | 7/2011 | Topham |
| 8,042,475 B2 | 10/2011 | Larcom |
| 8,156,875 B2 | 4/2012 | Neunzert |
| D658,912 S | 5/2012 | Winter |
| D659,450 S | 5/2012 | Winter |
| 8,181,579 B2 | 5/2012 | Leng |
| 8,191,881 B1 | 6/2012 | Iyewarun |
| D662,736 S | 7/2012 | Peery |
| 8,261,676 B2 | 9/2012 | Vannimwegen |
| D671,773 S | 12/2012 | Johnson |
| D671,775 S | 12/2012 | Clegg |
| D672,175 S | 12/2012 | Peery |
| 8,347,795 B2 | 1/2013 | Peery et al. |
| 8,397,652 B2 | 3/2013 | Peery |
| 8,397,653 B2 | 3/2013 | Ashby |
| 8,408,146 B2 | 4/2013 | Peery |
| D683,985 S | 6/2013 | Nye |
| 8,534,205 B1 | 9/2013 | Johnson |
| 8,555,789 B2 | 10/2013 | Jin et al. |
| 8,555,790 B2 | 10/2013 | Winter |
| 8,555,791 B2 | 10/2013 | Jin et al. |
| 8,578,863 B2 | 11/2013 | Peery et al. |
| D696,882 S | 1/2014 | Clegg et al. |
| 8,622,007 B2 | 1/2014 | Peery |
| D700,465 S | 3/2014 | Johnson |
| 8,677,912 B1 | 3/2014 | Tsai |
| 8,683,929 B2 | 4/2014 | Peery |
| 8,720,990 B2 | 5/2014 | Boydston |
| D708,462 S | 7/2014 | Nye et al. |
| D715,081 S | 10/2014 | Bennett |
| D727,074 S | 4/2015 | Johnson et al. |
| D733,475 S | 7/2015 | Johnson et al. |
| D734,081 S | 7/2015 | Johnson et al. |
| D739,672 S | 9/2015 | Johnson et al. |
| D739,673 S | 9/2015 | Johnson et al. |
| 9,138,050 B2 | 9/2015 | Peery |
| D742,671 S | 11/2015 | Johnson et al. |
| 9,192,230 B2 | 11/2015 | Clegg |
| D748,418 S | 2/2016 | Johnson et al. |
| 9,277,808 B2 | 3/2016 | Cai |
| D756,694 S | 5/2016 | Johnson et al. |
| D759,411 S | 6/2016 | Johnson et al. |
| 9,532,644 B2 | 1/2017 | Nye et al. |
| 9,549,612 B2 | 1/2017 | Peery et al. |
| 9,591,918 B2 | 3/2017 | Nye et al. |
| 9,642,459 B2 | 5/2017 | Peery et al. |
| 9,661,916 B2 | 5/2017 | Peery et al. |
| 9,730,514 B2 | 8/2017 | Peery et al. |
| 9,763,513 B2 | 9/2017 | Cai et al. |
| 9,763,517 B2 | 9/2017 | Peery et al. |
| 9,848,699 B2 | 12/2017 | Peery et al. |

(56) References Cited

U.S. PATENT DOCUMENTS

| | | | |
|---|---|---|---|
| 10,092,091 B1 | 10/2018 | Wang et al. | |
| D863,853 S | 10/2019 | Johnson et al. | |
| D864,637 S | 10/2019 | Johnson et al. | |
| 10,582,766 B2 | 3/2020 | Leng | |
| D901,954 S | 11/2020 | Clegg | |
| 10,932,560 B2 | 3/2021 | Leng | |
| D966,765 S | 10/2022 | Anderson | |
| D969,527 S | 11/2022 | Clegg | |
| 11,730,262 B2 * | 8/2023 | Johnson | A47B 3/00 428/35.7 |
| 11,819,121 B2 | 11/2023 | Olsen | |
| 2002/0092445 A1 | 7/2002 | Glover | |
| 2005/0011651 A1 | 1/2005 | Lell | |
| 2005/0045074 A1 | 3/2005 | Jin | |
| 2005/0052058 A1 | 3/2005 | Nyo | |
| 2005/0155531 A1 | 7/2005 | Chang | |
| 2006/0130716 A1 | 6/2006 | Ashby | |
| 2006/0130717 A1 | 6/2006 | Nye | |
| 2007/0234934 A1 | 10/2007 | Branch | |
| 2007/0289506 A1 | 12/2007 | Branch | |
| 2007/0290531 A1 | 12/2007 | Larsen | |
| 2008/0017083 A1 | 1/2008 | VanNimwegen | |
| 2009/0293778 A1 | 12/2009 | Branch | |
| 2011/0203493 A1 | 8/2011 | Ashby et al. | |
| 2012/0111239 A1 | 5/2012 | Stanford | |
| 2012/0111240 A1 | 5/2012 | Stanford | |
| 2012/0111242 A1 | 5/2012 | Branch | |
| 2012/0125239 A1 | 5/2012 | Stanford | |
| 2012/0175918 A1 | 7/2012 | Southwick et al. | |
| 2012/0199050 A1 | 8/2012 | Neunzert et al. | |
| 2012/0266787 A1 | 10/2012 | Peery et al. | |
| 2012/0266788 A1 | 10/2012 | Peery et al. | |
| 2012/0266789 A1 | 10/2012 | Peery et al. | |
| 2012/0266790 A1 | 10/2012 | Peery | |
| 2012/0266791 A1 | 10/2012 | Peery et al. | |
| 2013/0009427 A1 | 1/2013 | Johnson et al. | |
| 2013/0025509 A1 | 1/2013 | Jin et al. | |
| 2013/0167759 A1 | 7/2013 | Stanford | |
| 2013/0180438 A1 | 7/2013 | Nye et al. | |
| 2013/0220187 A1 | 8/2013 | Stanford | |
| 2014/0208992 A1 | 7/2014 | Cai et al. | |
| 2014/0345505 A1 | 11/2014 | Bennett et al. | |
| 2015/0101515 A1 | 4/2015 | Jin et al. | |
| 2016/0270522 A1 | 9/2016 | Winter | |
| 2017/0238698 A1 | 8/2017 | Nye et al. | |
| 2018/0064242 A1 | 3/2018 | Tsai | |
| 2018/0279768 A1 | 10/2018 | Leng | |
| 2019/0021484 A1 | 1/2019 | Leng | |
| 2021/0177138 A1 | 6/2021 | Leng | |

OTHER PUBLICATIONS

International Search Report and Written Opinion mailed Mar. 11, 2020, in related PCT Application No. PCT/US2020/12979.

Engineering Library, Beam Torsion from "stress Analysis Manual", Air Force Flight Dynamics Laboratory, Oct. 1986, https://engineeringlibrary.org/reference/beam-torsion-ari-force-stress (Year 1986).

Science Direct, Closed Section Beam excerpts from various books of dates, https://www.sciencedirect.com/topics/engineering/closed-section-beam (Year: 2022).

U.S. Appl. No. 29/937,956, filed Apr. 17, 2024.

* cited by examiner

TABLE

CROSS-REFERENCE TO RELATED APPLICATIONS

The present application is a continuation of U.S. patent application Ser. No. 16/243,993, entitled TABLE, filed on Jan. 9, 2019, now U.S. Pat. No. 11,730,262, issued Aug. 22, 2023, which is hereby incorporated by reference in its entirety.

BACKGROUND

Field of the Invention

The present invention generally relates to structures including at least a portion constructed from plastic and, more particularly, to furniture, such as tables, that may include molded plastic components.

Description of Related Art

Many different types of tables are known and are used for a variety of purposes. For example, conventional tables may include legs that are pivotally attached to a tabletop and the legs may be movable between a use position in which the legs extend outwardly from the tabletop and a storage position in which the legs are folded against the tabletop. Conventional tables with relatively large tabletops and folding legs are often referred to as "banquet tables" and these tables are frequently used in assembly halls, banquet halls, convention centers, hotels, schools, churches, and other locations where large groups of people meet. These tables can often be positioned in an assortment of configurations and used in a variety of settings. When the banquet tables are no longer needed, the table legs can be moved into the storage position and the tables may be more easily moved or stored.

Conventional tables often include tabletops constructed from materials such as wood, particleboard, or metal. Tabletops constructed from wood, particleboard, or metal, however, are often relatively heavy and this may make the table awkward or difficult to move. Tabletops constructed from wood or metal are also relatively expensive and these types of tabletops must generally be treated or finished before use. For example, tabletops constructed from wood must generally be sanded and painted, and metal tabletops must be formed into the desired shape and painted. In addition, because these wooden and metal tabletops are relatively heavy, the cost of shipping and transportation of the tables may be increased. The weight of the tabletop may make the tables more difficult to move and store.

In order to decrease the weight of conventional tables, tabletops may be constructed from relatively lightweight materials such as plastic. Disadvantageously, tabletops constructed from lightweight materials may require large reinforcing members or other structural parts such as braces, brackets, support members and the like to strengthen the tabletop. While these additional parts may increase the strength of the tabletop, the added parts may also increase the weight of the table. These additional parts may result in increased manufacturing costs and require additional time to assemble the table. In addition, extra fasteners may be required to assemble and connect these parts to the table, which may require extra time and labor during the manufacturing process. The additional parts and fasteners may further increase the cost of the table and make the table more difficult to manufacture. Moreover, these additional parts and fasteners may have sharp edges that can injure a user's legs or arms.

BRIEF SUMMARY

A need therefore exists for a table that eliminates or diminishes the above-described disadvantages and problems.

One aspect is a structure that may be constructed from plastic. For example, the structure may be constructed from molded plastic. If desired, the structure may be constructed from blow-molded plastic.

Another aspect is a structure that may be constructed from molded plastic, such as a tabletop. The tabletop may include a generally planar element, such as a central or body portion, and the central or body portion of the tabletop may have a generally planar upper and/or lower surface. The tabletop may include an outwardly extending portion, such as a projection or protruding structure. The outwardly extending portion, which may extend downwardly relative to the upper surface or lower surface of the tabletop, may be a lip. The lip may form at least a portion of a sidewall or edge of the tabletop.

Still another aspect is a tabletop may be integrally formed as part of a unitary, one-piece structure. For example, the tabletop may be integrally formed as part of a unitary, one-piece construction during a blow-molding process. The tabletop may include one or more features that may be integrally formed as part of the unitary, one-piece structure. For example, a lip may be integrally formed as part of the unitary, one-piece structure.

Yet another aspect is a tabletop that may include a lip extending along at least a part of a perimeter of the tabletop and/or the lip may be spaced inwardly from the perimeter of the tabletop. In an exemplary configuration, the lip may form one or more sidewalls and/or edges of the tabletop. In this exemplary configuration, an outer wall or surface of the lip may extend in a substantially normal direction relative to the upper surface and/or the lower surface of the tabletop, and an inner wall or surface of the lip may be disposed in an inward direction relative to the outer wall of the lip. The lip may have a height that may be measured from a bottom portion of the lip to an upper portion of the lip and/or an upper or lower portion of the tabletop. The lip, for example, may have substantially the same height. Thus, in an exemplary configuration, the lip may extend about the perimeter of the tabletop and the lip may have substantially the same height. The lip, however, may also have different heights. For example, at least a portion of the lip along the sides of the tabletop may have a shorter height than the lip along the ends of the tabletop. This may allow, for example, a portion of the frame to be exposed along the sides of the tabletop. One skilled in the art will appreciate, after reviewing this disclosure, that the lip may have various suitable shapes, sizes, configurations, and/or arrangements depending, for example, upon the intended use of the table.

In an exemplary embodiment, the lip may include an outer wall and an inner wall. The outer wall and inner wall may be separated by a distance. For example, if the lip is constructed from molded plastic, the outer wall and inner wall may be separated by a hollow interior portion, which may be formed during the molding process. The outer wall and inner wall of the lip may also contact or touch. For instance, during the molding process, at least a portion of the outer wall and at least a portion of the inner wall may contact or touch. This may allow, for example, a compression edge to be formed.

Still yet another aspect is a lip that may include one or more extending or protruding portions. For example, the inner surface of the lip may include one or more inwardly extending portions. The inwardly extending portions may have a height that is less than the height of the lip. In particular, the height of the lip may be greater than the height of the inwardly extending portion. The height of the inwardly extending portion may be less than about eighty percent (80%) of the height of the lip, less than about seventy percent (70%) of the height of the lip, less than about sixty percent (60%) of the height of the lip, less than about fifty percent (50%) of the height of the lip, less than about forty percent (40%) of the height of the lip, less than about thirty percent (30%) of the height of the lip, less than about twenty percent (20%) of the height of the lip, or less than about ten percent (10%) of the height of the lip. The inwardly extending portion may be sized and configured to increase the strength and/or structural rigidity of the lip. The inwardly extending portion may also include one or more channels or recessed portions. The recessed portions may be disposed in an inner portion and/or lower portion of the inwardly extending structures. The inwardly extending portion may include a hollow interior portion that may be in fluid communication with a hollow interior portion of the tabletop. The hollow interior portion of the inwardly extending portion may also be in fluid communication with the lip.

A further aspect is a lip that may include one or more risers. The risers may facilitate gas flow during the molding process. For example, the risers may facilitate gas flow between a hollow interior portion of the tabletop and the lip. In particular, the risers may facilitate gas flow between a hollow interior portion of the tabletop and a portion of the lip, such as a hollow interior portion of the lip.

Another further aspect is a lip that may include one or more attachment portions which are sized and configured to allow a frame to be attached to the lip. In particular, the attachment portions may be sized and configured to allow the frame to be attached to the inwardly extending portion of the lip. The attachment portions may include a surface that is sized and configured to contact or abut a side rail of the frame. The attachment portions may facilitate attachment of the frame to the inwardly extending portion of the lip by one or more fasteners.

Still another further aspect is frame that may include one or more side rails. The side rails of the frame may include a receiving portion that is sized and configured to receive the inwardly extending portion of the lip. For example, the receiving portion may have a generally L-shaped configuration and the inwardly extending portion of the lip may be disposed in the receiving portion of the side rails of the frame.

Another aspect is a molded plastic tabletop that may include an upper surface, a lower surface, and a hollow interior portion disposed between the upper surface and the lower surface of the tabletop. A lip may extend downwardly relative to the lower surface of the tabletop and the lip may include an outer surface and an inner surface. One or more inwardly extending portions may extend inwardly from the inner portion of the lip. The inwardly extending portions may be sized and configured to increase the strength and/or structural integrity of the lip. The inwardly extending portion may also allow fluid communication between the hollow interior portion of the tabletop and a lip. For example, the inwardly extending portion may include a first portion connected to the lower surface of the tabletop and a second portion connected to the inner surface of the lip, and the inwardly extending portion may include a hollow interior portion in fluid communication with the hollow interior portion of the tabletop. The tabletop may include one or more elongated tack-offs and the elongated tack-offs may prevent fluid flow between the hollow interior portion of the tabletop and the lip.

Still another aspect is a frame for a molded plastic tabletop that may include one or more side rails and the side rails may include a receiving portion. The receiving portion may receive a structure that extends inwardly from an inner surface of a lip of the tabletop. For example, the receiving portion may receive the inwardly extending portions of the lip. The receiving portion may contact or abut the inwardly extending portion of the lip. The side rails of the frame may also contact or abut a distal portion of the lip. In addition, an elongated tack-off may be generally disposed between the tabletop and the lip; and the elongated tack-off may at least substantially prevent fluid flow between the tabletop and the lip. The inwardly extending portion may allow fluid flow between the hollow interior portion of the tabletop and the lip, which may facilitate formation of the lip during the molding process.

Advantageously, the receiving portion of the frame and inwardly extending portion of the lip may help create a tabletop that is relatively high-strength, impact resistant, and aesthetically pleasing. In addition, the lip may generally hide the frame from view during use of the table or the lip may allow a portion of the frame to be visible during use of the table. After reviewing this disclosure, one skill in the art will be appreciate that the table may include any suitable number, size, shape, configuration, and/or arrangement of inwardly extending portions depending, for example, upon the intended use of the table.

A further aspect is a blow-molded plastic structure may be constructed using a blow-molding process. The blow-molded plastic structure may comprise a tabletop including an upper surface, a lower surface, and a hollow interior portion disposed between the upper surface and the lower surface of the tabletop; a lip extending downwardly relative to the lower surface of the tabletop, the lip including an outer surface and an inner surface; an inwardly extending portion extending inwardly from the inner surface of the lip; and a side rail of a frame, the side rail including a receiving portion that receives the inwardly extending portion, the side rail including a portion that supports the lower surface of the tabletop, the side rail including a portion that supports the lip. The inwardly extending portion may enclose the receiving portion of the side rail. A fastener may extend through an upper portion of the side rail and into the inwardly extending portion to connect the side rail to the tabletop. A hollow interior portion of the inwardly extending portion may be in fluid communication with the hollow interior portion of the tabletop and a hollow interior portion of the lip. The tabletop, the lip, and the inwardly extending portion may be integrally formed as part of a unitary, one-piece structure during the blow-molding process. A height of the inwardly extending portion has a height less than a height of the lip. An upper portion of the side rail of the frame may be disposed in a frame receiving recess in the lower surface of the tabletop, the receiving portion of the side rail may enclose the inwardly extending portion, and a lower portion of the side rail of the frame may be generally aligned with a lower portion of the lip. The receiving portion of the side rail may have a generally L-shaped configuration with a first surface disposed at least proximate a first side of the inwardly receiving portion and a second surface disposed at least proximate a second side of the inwardly receiving portion. A first opening may be disposed in an inner surface of the side rail of the frame, a second opening may be disposed in an inner surface of the receiving portion of the side rail of the frame, and a fastener may be disposed in the first opening and the second opening, the fastener may extend through the first opening and the second opening and be connected to the inwardly extending portion. A first surface of the side rail may contact the lower surface of the tabletop, a first surface of the receiving portion of the side rail may contact a first surface of the inwardly extending portion; a second surface of the receiving portion of the side rail may contact a second surface of the inwardly extending portion; and a second surface of the side rail contacts the inner surface of the lip.

Another further aspect is a molded plastic tabletop may include an upper surface and a lower surface; a lip extending downwardly relative to the lower surface of the tabletop, the lip including an outer surface and an inner surface; an inwardly extending portion extending inwardly from the inner surface of the lip; and a side rail of a frame, the side rail including a receiving portion that receives the inwardly extending portion, the side rail including a portion that supports the lower surface of the tabletop, the side rail including a portion that supports the lip. The inwardly extending portion may enclose the receiving portion of the side rail. A fastener may extend through an upper portion of the side rail and into the inwardly extending portion to connect the side rail to the tabletop. A hollow interior portion of the inwardly extending portion, the hollow interior portion of the inwardly extending portion in fluid communication with a hollow interior portion of the tabletop and a hollow interior portion of the lip. The tabletop, the lip, and the inwardly extending portion may be integrally formed as part of a unitary, one-piece structure during a molding process. A height of the inwardly extending portion may be less than a height of the lip. An upper portion of the side rail of the frame may be disposed in a frame receiving recess in the lower surface of the tabletop; the receiving portion of the side rail may enclose the inwardly extending portion; and a lower portion of the side rail of the frame may be generally aligned with a lower portion of the lip. The receiving portion of the side rail may have a generally L-shaped configuration with a first surface disposed at least proximate a first side of the inwardly receiving portion and a second surface disposed at least proximate a second side of the inwardly receiving portion. A first opening may be disposed in an inner surface of the side rail of the frame, a second opening may be disposed in an inner surface of the receiving portion of the side rail of the frame, and a fastener may be disposed in the first opening and the second opening, the fastener may extend through the first opening and the second opening and be connected to the inwardly extending portion. A first surface of the side rail may contact the lower surface of the tabletop, a first surface of the receiving portion of the side rail may contact a first surface of the inwardly extending portion; a second surface of the receiving portion of the side rail may contact a second surface of the inwardly extending portion; and a second surface of the side rail may contact the inner surface of the lip These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages, and features of the present invention. It will be appreciated that these drawings depict only exemplary embodiments of the invention and are not intended to limit its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

DETAILED DESCRIPTION OF SOME EMBODIMENTS

Figure 1:
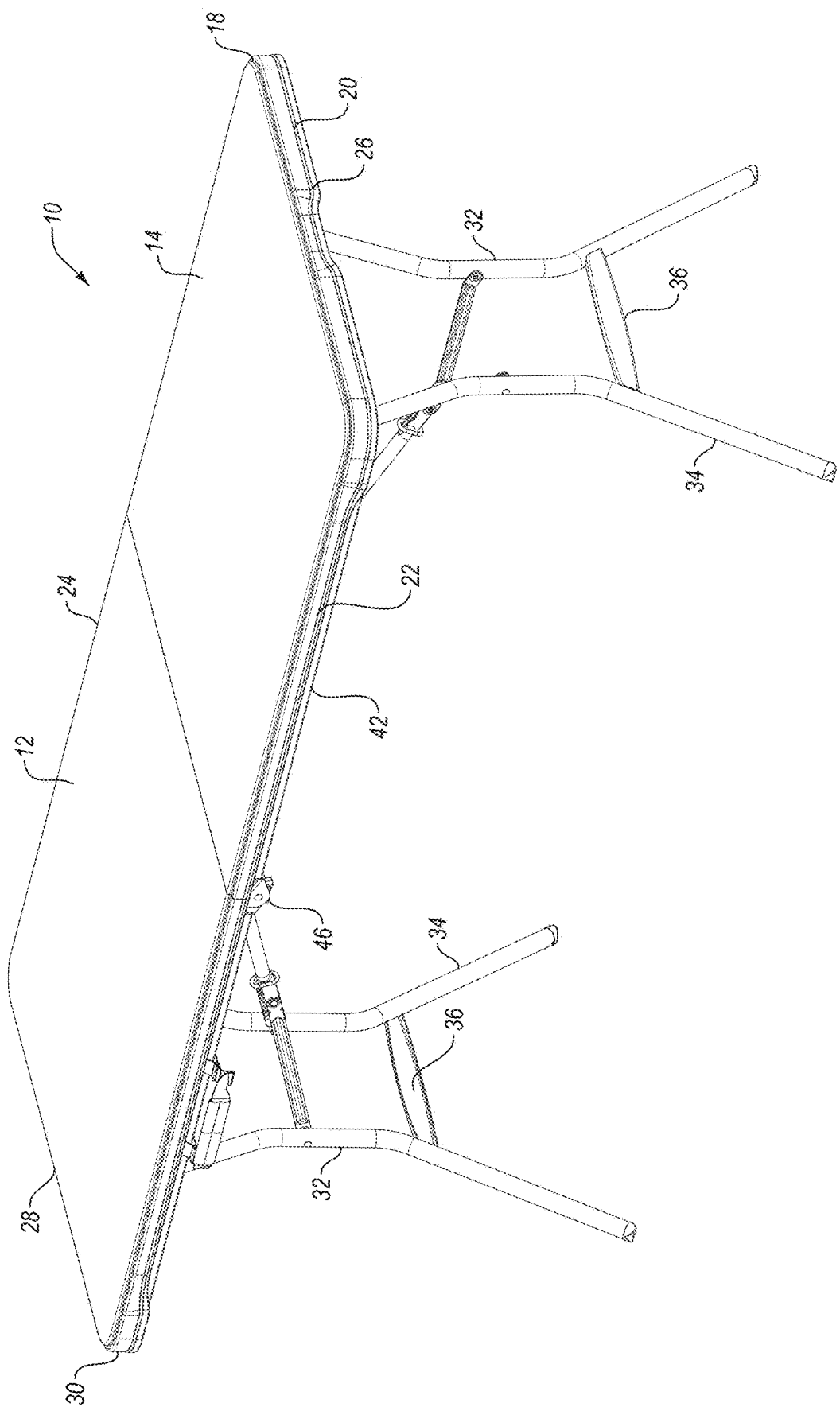
FIG. 1 is a perspective view of an exemplary table.

The following exemplary embodiments are generally described in connection with tables. The principles of the present invention, however, are not limited to tables. In particular, the principles of the present invention may be implemented in connection with other articles of furniture and in other structures that include molded plastic components. In addition, it will be understood that, with the benefit of the present disclosure, the tables disclosed herein can have a variety of shapes, sizes, configurations, and arrangements. Moreover, while the tables shown in the accompanying figures may be configured for use in connection with fold-in-half tables, it will be appreciated the tables may have any suitable shapes, sizes, configurations, and/or arrangements. For instance, the tables described herein may be utility tables, round tables, personal tables, conference tables, seminar tables, recreation tables, adjustable height tables, card tables, and the like. Further, the invention disclosed herein, and components thereof may be successfully used in connection with other types of furniture (e.g., chairs, stacking chairs, kids' chairs, benches, picnic tables, etc.), structures (e.g., storage sheds, deck boxes, coolers, garden boxes, playground equipment, etc.), and the like.

To assist in the description of exemplary embodiments of the tables, words such as top, bottom, front, rear, upper, lower, right and left may be used to describe the accompanying figures which may be, but are not necessarily, drawn to scale. It will further be appreciated the tables can be disposed in a variety of desired positions or orientations, and used in numerous locations, environments, and arrangements. A detailed description of some exemplary embodiments of the tables now follows.

As shown in the accompanying figures, an exemplary table 10 may include a tabletop 12 that may be constructed from molded plastic. The tabletop 12 may include an upper portion 14, such as an upper surface, a lower portion 16, such as a lower or underneath surface, and an outer boundary or perimeter 18. As shown in the accompanying figures, a lip 20 may be disposed about the perimeter 18 and the lip may extend downwardly relative to the upper portion 14 and/or lower portion 16 of the tabletop 12. The upper portion 14 may be spaced apart from the lower portion 16 of the tabletop 12 by a distance, which may be a generally constant distance in some embodiments. As discussed in more detail below, the tabletop 12 may include a hollow interior portion and the hollow interior portion may be disposed between the upper portion 14 and the lower portion 16 of the tabletop 12.

In addition, the tabletop 12 may further include one or more sides, such as a first side 22 and a second side 24. The tabletop 12 may also include one or more ends, such as a first end 26 and a second end 28. The tabletop 12 may also include one or more corners 30. The tabletop 12, including the upper portion 14, the lower portion 16, the hollow interior portion, the lip 20, the first side 22, the second side 24, the first end 26, the second end 28, and/or the corners 30 may be integrally formed as part of unitary, one-piece structure during the molding process. If the tabletop 12 is constructed from plastic, it may be formed in the desired shape by blow-molding, injection molding, rotary molding, and/or other suitable processes. It will also be appreciated that the tabletop 12 may be constructed using various materials such as wood, metal, and the like.

As shown in the accompanying figures, the lip 20 may be disposed about the perimeter 18 of the tabletop 12. The lip 20 may extend around an entirety of the perimeter 18 of the tabletop 12 or one or more portions of the perimeter. The lip 20 may also be spaced inwardly from the perimeter 18 and the lip may be any structure disposed at an angle and/or outwardly extending from the tabletop 12. For example, the lip 20 may extend outwardly and/or downwardly relative to the upper portion 14 and/or lower portion 16 of the tabletop 12. For instance, the lip 20 may extend in a substantially normal direction from the lower portion 16 of the tabletop 12. In this exemplary configuration, when the tabletop 12 is oriented with the upper portion 14 facing up, the lip 20 may extend generally downwardly.

Figure 2:
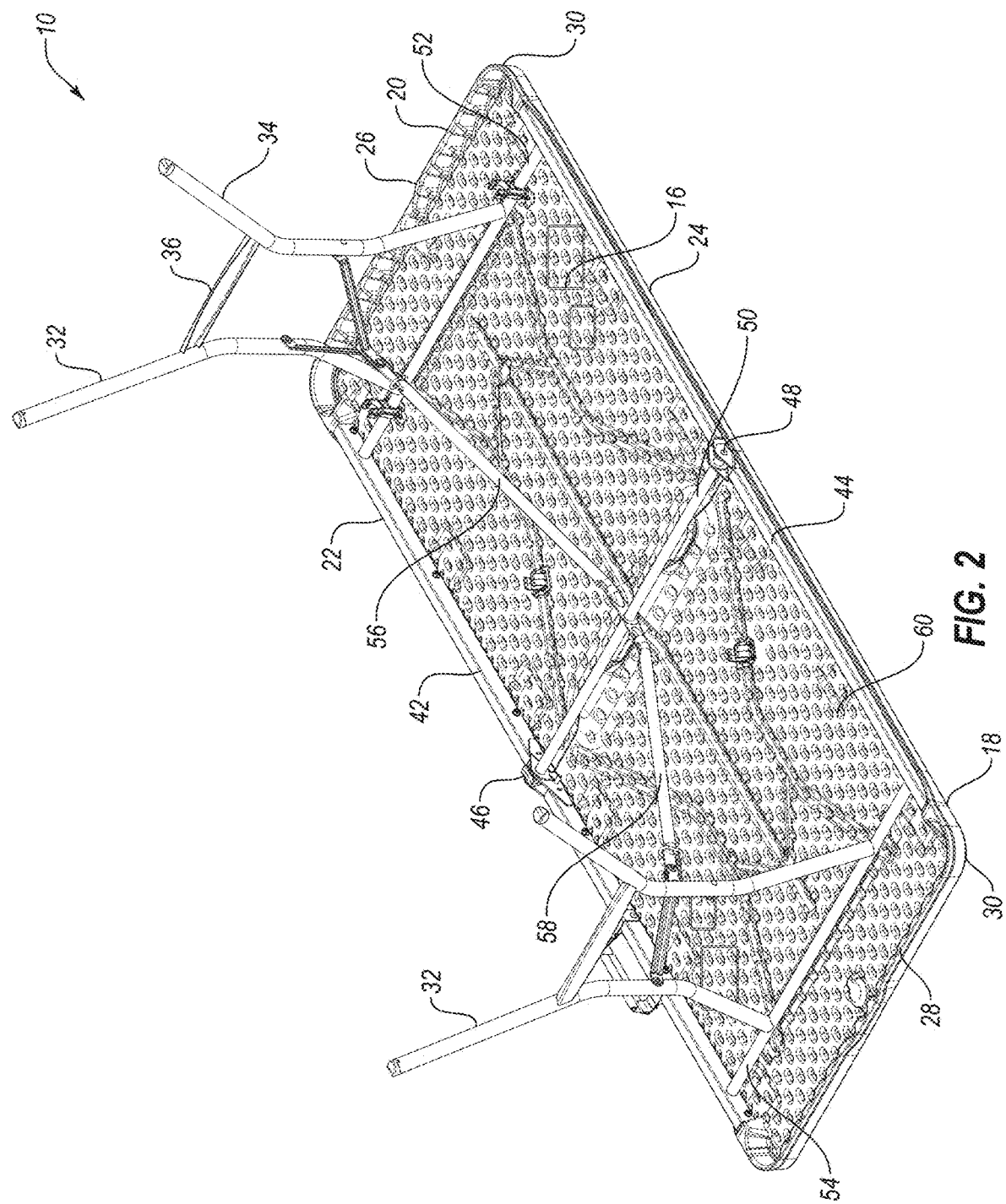
FIG. 2 is another perspective view of the exemplary table shown in FIG. 1, illustrating the support structures disposed in an extended configuration.
Figure 3:
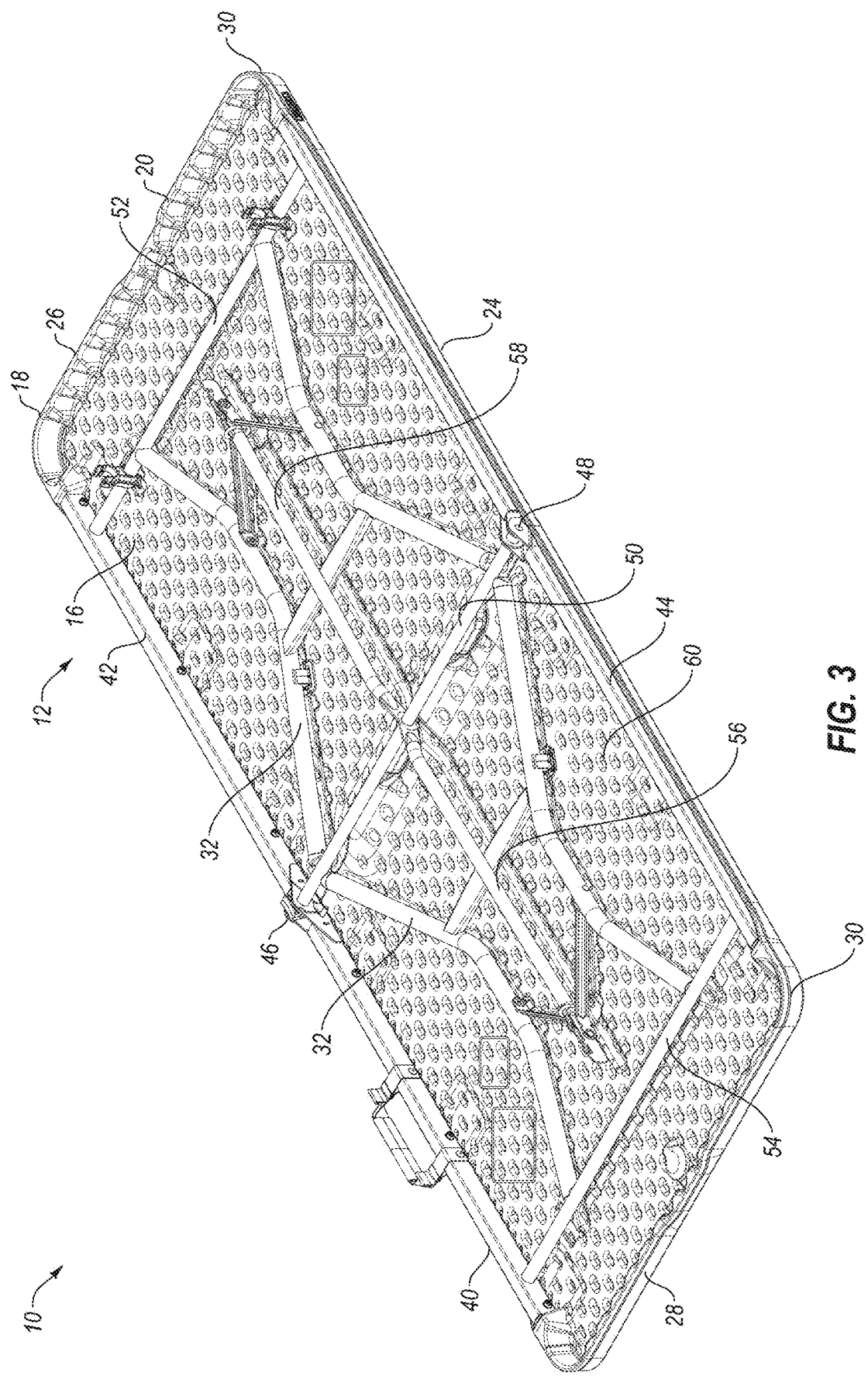
FIG. 3 is another perspective view of the exemplary table shown in FIG. 1, illustrating the support structures disposed in a collapsed configuration.

As shown in FIGS. 1 to 3, the table 10 may include a one or more support structures 32, which may be sized and configured to support the tabletop 12 above a surface such as the floor or ground. The support structures 32 may include one or more legs or supports 34 and the support structures may be movable between an extended or use position, such as shown in FIGS. 1 and 2, and a collapsed or storage position such as shown in FIG. 3. As shown in the accompanying figures, the support structures 32 may include a pair of legs or supports 34 and a connecting member 36 may interconnect the supports.

The tabletop 12 may include a hollow interior portion 38 and the hollow interior portion may be at least partially disposed between the upper portion 14 and the lower portion 16 of the tabletop. The hollow interior portion 38 may be formed during the molding process. For example, if the tabletop 12 is constructed from blow-molded plastic, the hollow interior portion 38 may be formed during the blow-molding process. In addition, the hollow interior portion 38 may be integrally formed during the molding process as part of a unitary, one-piece structure. The hollow interior portion 38 may be filled with foam or other materials, if desired. One skilled in the art will appreciate, after reviewing this disclosure, that the hollow interior portion 38 may not be required and the tabletop 12 could have other suitable configurations and arrangements.

The table 10 may include a frame 40 that is connected to the tabletop 12. The frame 40 may include a first side rail 42 disposed along one side of the tabletop 12 and a second side rail 44 disposed along another side of the tabletop. For example, the first side rail 42 may be disposed along the first side 22 of the tabletop 12 and the second side rail 44 may be disposed along the second side 24 of the tabletop. The first and second side rails 42, 44 may extend along a length of the tabletop 12 and the side rails may help support the tabletop 12. If the table 10 is a fold-in-half table, then a first portion of the first side rail 42 may be connected to a first portion of the tabletop 12 and a second portion of the first side rail may be connected to a second portion of the tabletop. Similarly, a first portion of the second side rail 42 may be connected to a first portion of the tabletop 12 and a second portion of the second side rail may be connected to a second portion of the tabletop. The first and second portions of the first side rail 42 may be connected by a member, such as a hinge 46, and the first and second portions of the second side rail 44 may be connected by a member, such as a hinge 48. A cross member, such as a center cross member 50, may be disposed at least portion a center portion of the tabletop 12 and the center cross member may be connected to the first hinge 46 and the second hinge 48.

The support structures 32 may be connected to the frame 40 and the support structures may be movable relative to the frame to allow the support structures to move between the outwardly extending or use position and the collapsed or storage position. For example, cross members 52, 54 may connect the support structures 32 and the frame 40. In an exemplary embodiment, the cross members 52, 54 may be part of the support structures 32 and the cross members may be connected to the side rails 42, 44 of the frame 40. In another exemplary embodiment, the cross members 52, 54 may be part of the frame 40.

The table 10 may also include a first brace assembly 56 and a second brace assembly 58, which may be connected to the support structures 32. In particular, the first brace assembly 56 may be connected to a first support structure and the second brace assembly 58 may be connected to a second support structure. The brace assemblies 56, 58 may be sized and configured to allow the support structures 32 to move between the use and storage positions. The brace assemblies 56, 58 may be connected to the center cross member 50.

It will be appreciated that the support structures 32, the legs 34, the frame 40, and the brace assemblies 56, 58 may have other suitable shapes, sizes, configurations, and/or arrangements depending, for example, upon the intended use of the table 10. It will also be appreciated that the support structures 32, the legs 34, the frame 40, and the brace assemblies 56, 58 may be connected to any suitable portions of the table 10. In addition, it will be appreciated that the table 10 may include any suitable number of the support structures 32, the legs 34, the frame 40, and the brace assemblies 56, 58. It will further be appreciated that the table 10 may not require all of these parts or components, and the table may have other parts, components, features, aspects, characteristics, and the like, if desired.

Figure 4:
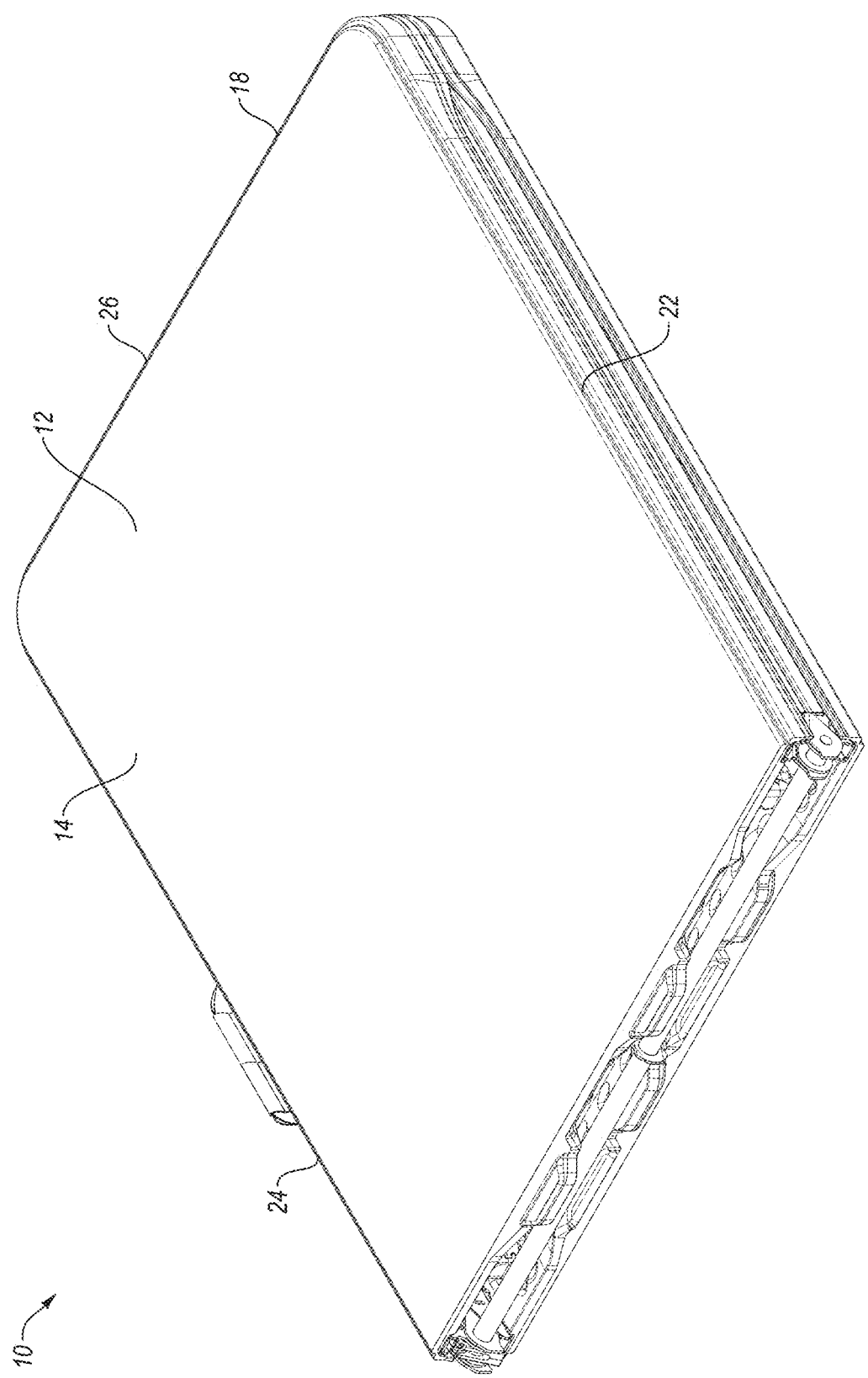
FIG. 4 is still another perspective view of the exemplary table shown in FIG. 1, illustrating the table in a folded configuration.
Figure 5:
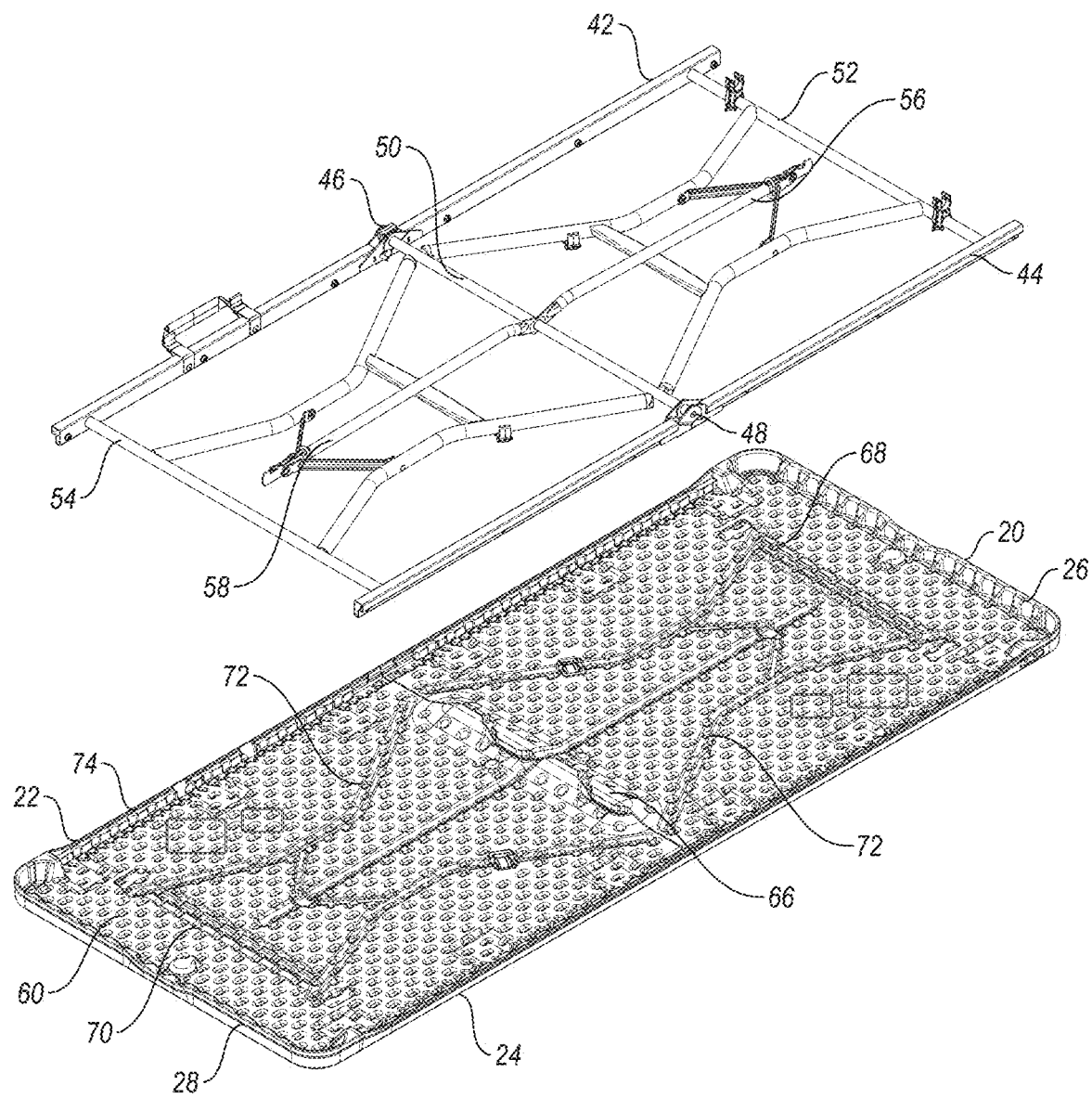
FIG. 5 is an exploded view of the exemplary table shown in FIG. 1.

The table 10 may be a fold-in-half table that may be disposed in a folded or collapsed configuration, such as shown in FIG. 4. The table 10 may also be sized and configured to be stacked with one or more additional tables. In the stacked configuration, the tables 10 are preferably nested together to reduce a height of the stacked tables. Reduction in the height may allow the tables 10 to be shipped, stored, and transported in a smaller volume. This may result in significant cost savings to the manufacturer, for example, because less storage space may be required and a substantial reduction in transportation costs may be achieved. Exemplary embodiments of nested tables are shown and described in U.S. Pat. No. 8,397,652, issued Mar. 19, 2012; U.S. Pat. No. 8,408,146, issued Apr. 2, 2013; U.S. Pat. No. 8,622,007, issued Jan. 7, 2014; U.S. Pat. No. 9,138,050 issued Sep. 22, 2015; and U.S. Pat. No. 8,347,795, issued Jan. 8, 2013; each of which are incorporated by reference in its entirety.

Figure 13:
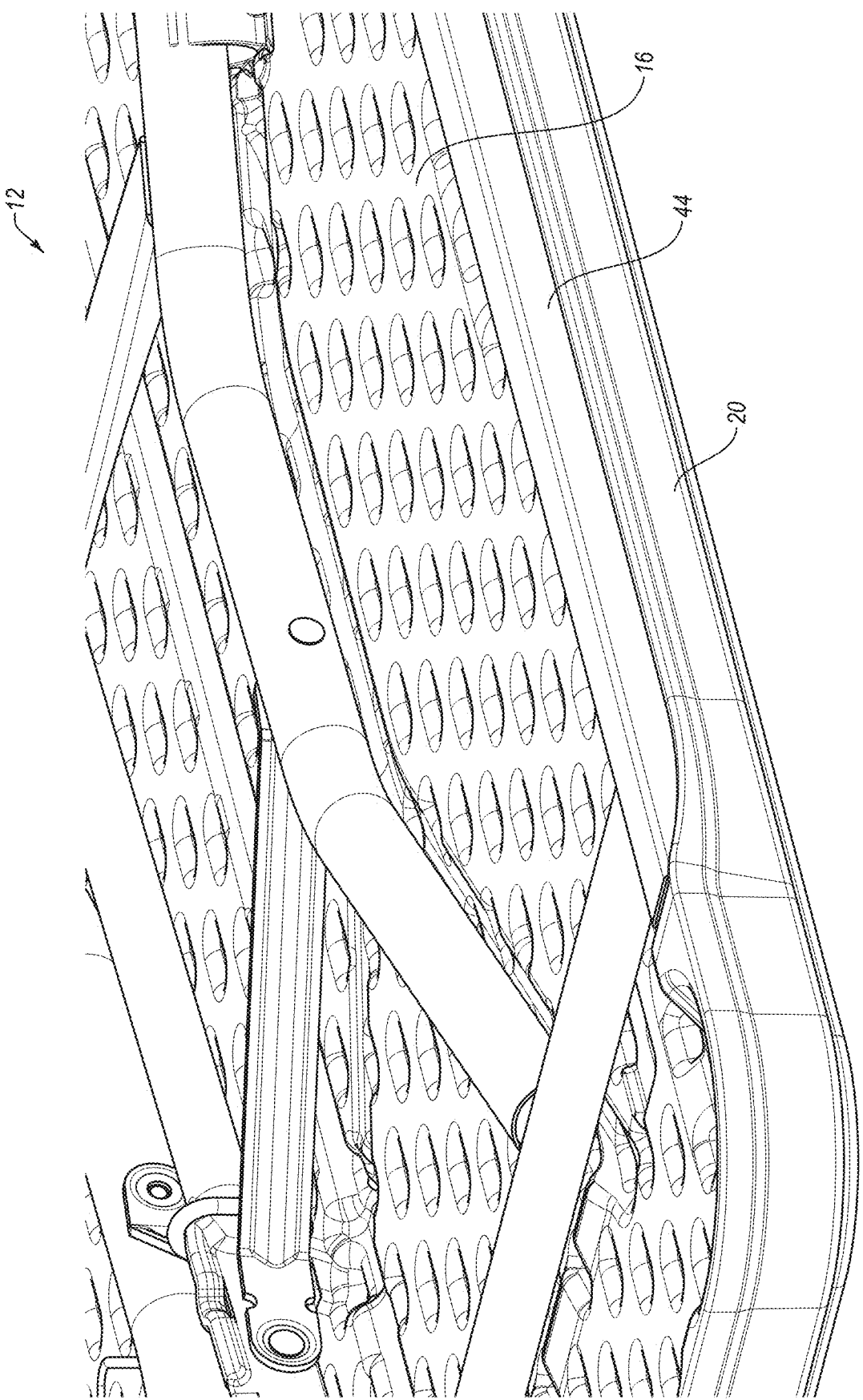
FIG. 13 is an enlarged, perspective view of a portion of an exemplary embodiment of a table, illustrating a portion of the frame exposed within an opening in the lip of the tabletop.
Figure 14:
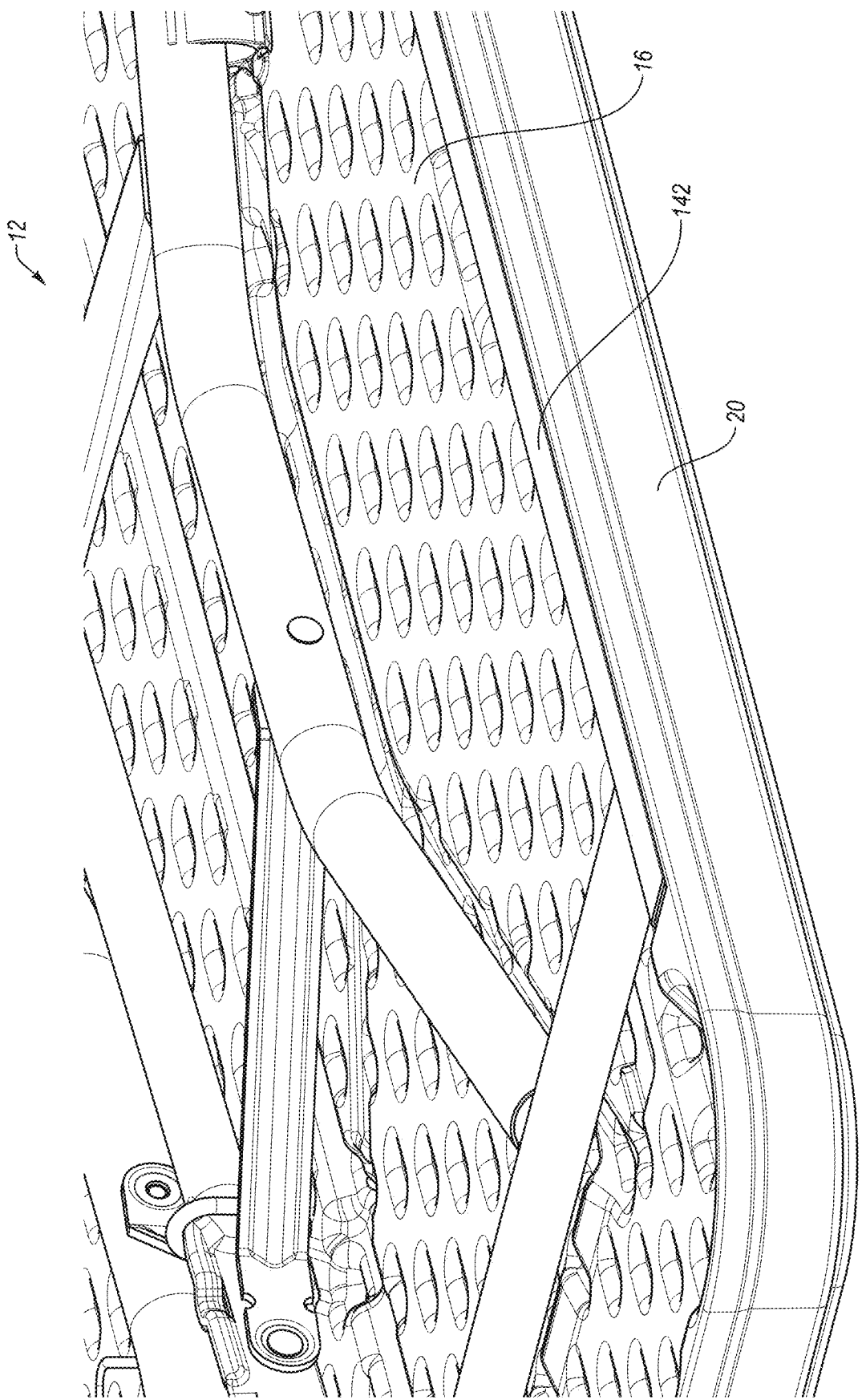
FIG. 14 is an enlarged, perspective view of a portion of an exemplary embodiment of a table, illustrating the lip generally hiding the frame from view when the table is being used.

As shown in FIGS. 2 and 3, the side rails 42, 44 of the frame 40 may be disposed along the sides 22, 24 of the tabletop 12. For example, the first side rail 42 may be disposed along the first side 22 of the tabletop 12 and the second side rail 44 may be disposed along the second side 24 of the tabletop. Advantageously, if the side rails 42, 44 are disposed proximate the sides 22, 24 of the tabletop 12, then the sides of the tabletop 12 may be supported by the frame 40, which may help create a strong and sturdy table 10. In addition, the side rails 42, 44 may be sized and configured to support the lip 20, which may also help create a strong and sturdy table 10. Further, a portion of the side rails 42, 44 may be exposed along the sides 22, 24 of the tabletop 12, as shown in FIG. 13, which may help show consumers that the table 10 has significant strength. For example, a portion of the first side rail 42 may be exposed along the first side 22 of the tabletop 12 and a portion of the second side rail 44 may be exposed along the second side 24 of the tabletop. The exposed portions of the frame 40 may create the appearance of a strong and sturdy table 10. As shown in FIG. 14, the side rails 42, 44 of the frame 40 may not be exposed. In an exemplary embodiment, the side rails 42, 44 may directly support the lip 20. For example, a lower portion of the side rails 42, 44 may be disposed at least proximate or may contact or abut a lower portion of the lip 20. In this configuration, the lip 20 may help prevent damage to the frame 40 and/or the side rails 42, 44 may help increase the strength, structural integrity, and/or impact resistance of the lip.

In an exemplary embodiment, the lip 20 may be disposed about the perimeter 18 of the tabletop 20 and the side rails 42, 44 of the frame 40 may be disposed adjacent to the lip. A portion of the side rails 42, 44 may directly contact and support a portion of the lip 20. For example, the side rails 42, 44 may directly contact and support a lower portion of the lip 20. This may provide increased strength and/or structural integrity to the lip 20.

As shown in FIGS. 3 and 4, the tabletop 12 may include one or more depressions 60, which may also be referred to as tack-offs. The depressions 60 may be sized, shaped, configured, and arranged to provide increased strength, stiffness, and/or rigidity to the tabletop 12. The depressions 60 may cover a majority, substantially all or the entirety of the lower portion 16 of the tabletop 12. In addition, the depressions 60 may have a generally uniform shape, size, configuration, and arrangement. The depressions 60 may further have an elongated shape that is aligned with an axis and the depressions 60 may be aligned in a series of rows and/or columns that extend along the length and/or width of the tabletop 12. Additionally, the depressions 60 in adjacent rows and/or columns may be offset, and the distance between adjacent depressions in the rows and/or columns may be generally the same. For example, the distance between adjacent depressions in each row and/or column may be generally constant or the same. The distance between adjacent rows and columns may also be generally constant or the same.

The depressions 60 may be used to create a tabletop 12 with generally uniform characteristics or qualities. For example, if the depressions 60 are consistently spaced, that may allow the upper portion 14 of the tabletop 12 to be uniformly supported. In addition, if the depressions 60 are separated by a generally constant distance, which may be measured from a center of one depression 60 to a center of an adjacent depression 60, that may create a tabletop 12 with more uniform characteristics or qualities. The distance between adjacent depressions 60 may be measured longitudinally, laterally, or at an angle depending, for example, upon the arrangement of the depressions 60.

The depressions 60 may also be disposed in a pattern and the depressions may be generally aligned and/or disposed in predetermined locations within the pattern. The pattern may include, for example, a number of rows 62 that extend along a length of the tabletop 12 and/or a number of columns 64 that extend along a width of the tabletop 12. The depressions may also be disposed in other suitable forms and patterns, and may have other shapes, sizes, configurations, and arrangements, depending, for example, upon the intended use of the tabletop 12.

The depressions 60 may also have different characteristics depending, for example, upon the particular configuration of the depressions. For example, the depressions may have an elongated length and a depression may have increased strength along its length. The depression 60 may also have a non-circular configuration with increased strength in one direction in comparison to another direction. Advantageously, if the depressions 60 have different characteristics, then the depressions can be arranged or configured so the structure has certain characteristics. In particular, the depressions 60 may be arranged into a pattern to maximize certain characteristics and/or create a structure with generally uniform characteristics. For instance, the pattern may include generally uniformly spaced depressions 60 that are separated by a generally constant distance and/or disposed in standardized arrangement. A consistent arrangement of the depressions 60 may help create a structure with uniform characteristics. For example, a generally constant pattern of depressions 60 may create a structure with generally uniform strength and structural integrity.

The tabletop 12 may include one or more recesses and the recesses may be sized and configured to receive a portion of the support structures 32 and/or the frame 40. For example, the tabletop 12 may include a recess 66 that is sized and configured to receive the center cross member 50. The tabletop 12 may also include a recess 68 that is sized and configured to receive the cross member 52 and a recess 70 that is sized and configured to receive the cross member 54. The tabletop 12 may further include recesses 72 that are sized and configured to receive the support structures 32 when the support structures are in the collapsed or folded position.

The tabletop 12 may include a first frame receiving recess 74 that is sized and configured to receive a first portion of the frame such as the first side rail 42. The tabletop 12 may also include a second frame receiving recess 76 that is sized and configured to receive a second portion of the frame such as the second side rail 44. As discussed in greater detail below, the first and second frame receiving recesses 74, 76 may be disposed proximate the lip 20. Advantageously, this may allow the first and second side rails 42, 44 to support the outer edges and/or sides of the tabletop 12. This may also allow the first and second side rails 42, 44 to support the lip 20. Significantly, the lip 20 may be a stronger and/or more rigid structure if a portion of the side rails 42, 44 contact or abut a portion of the lip, which may create a table 10 that is less likely to be damaged. For example, if the lip 20 is support by the side rails 42, 44, then the lip may be more resistant to damage. That is, the lip 20 may be able to withstand a larger force or impact if the side rails 42, 44 of the frame 40 directly support the lip.

For instance, the table 10 may be constructed and then shipped to a retailer or end user. During the shipping process, the table 10 may be dropped or may contact other products. Such contact may impose forces on the tabletop 12 such as the sides 22, 24. The lip 20 and the side rails 42, 44 may be sized and configured to strengthen and/or reinforce the sides 22, 24 of the tabletop 12, which may reduce or prevent damage to the table 10. The lip 20 and side rails 42, 44 may also help reduce or prevent damage during use and/or storage. For example, the table 10 may be dropped, tipped on its side, stuffed into a storage closet, etc., which may result in contact between the tabletop 12 and various items (e.g., the floor, closet doors, other tables, etc.). The lip 20 and side rails 42, 44 may help prevent damage to the tabletop 12.

In an exemplary embodiment, the lip 20 may include an outer wall 80 and the outer wall may be disposed about at least a portion of the perimeter 18 of the tabletop 12. In greater detail, the outer wall 80 may extend about the perimeter 18 and the outer wall 80 may be oriented substantially normal or perpendicular to the upper portion 14 or the lower portion 16 of the tabletop 12.

Figure 8:
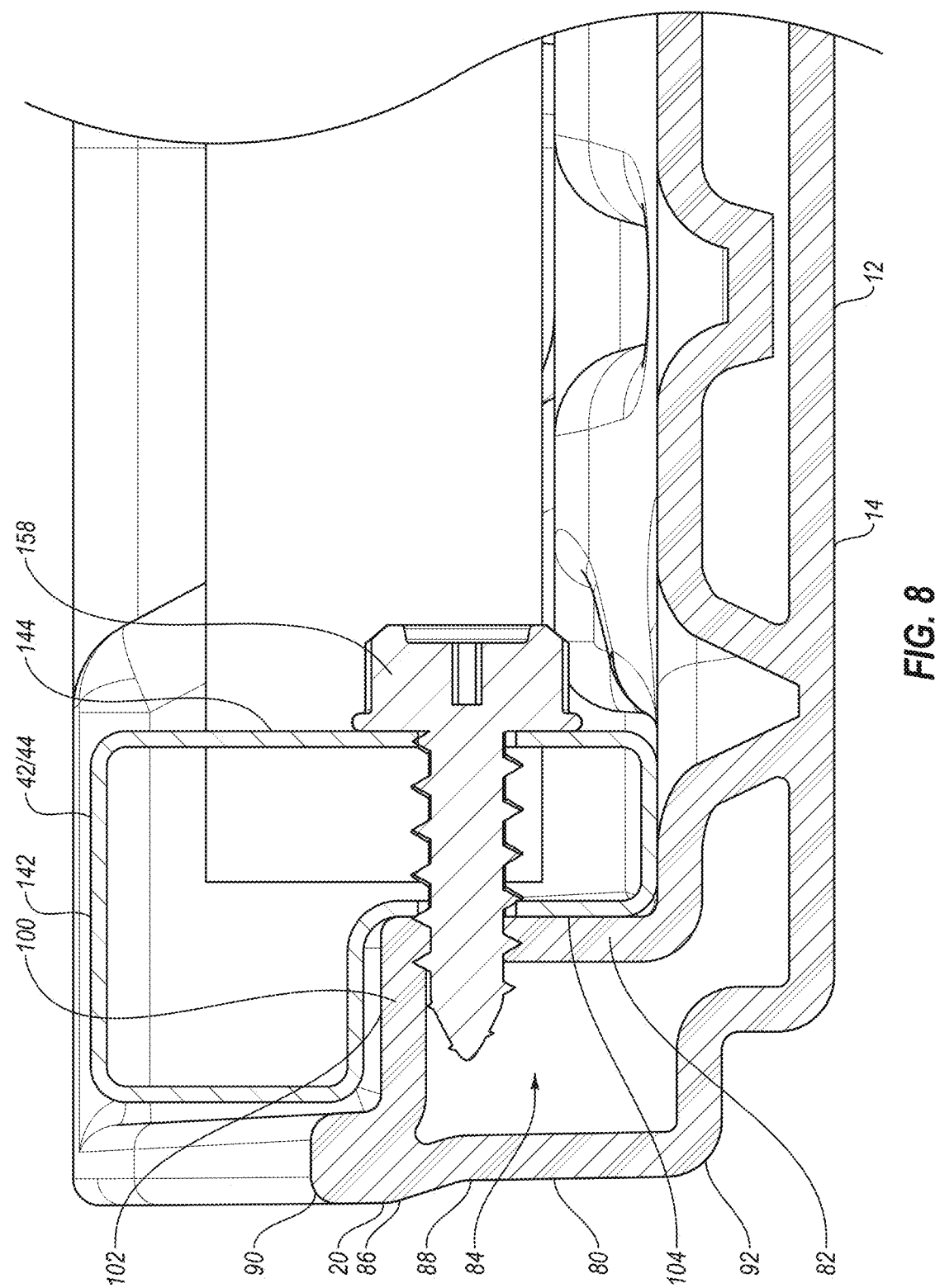
FIG. 8 is a cross-sectional side view of a portion of an exemplary embodiment of a table, illustrating a fastener connecting a frame to the tabletop.
Figure 9:
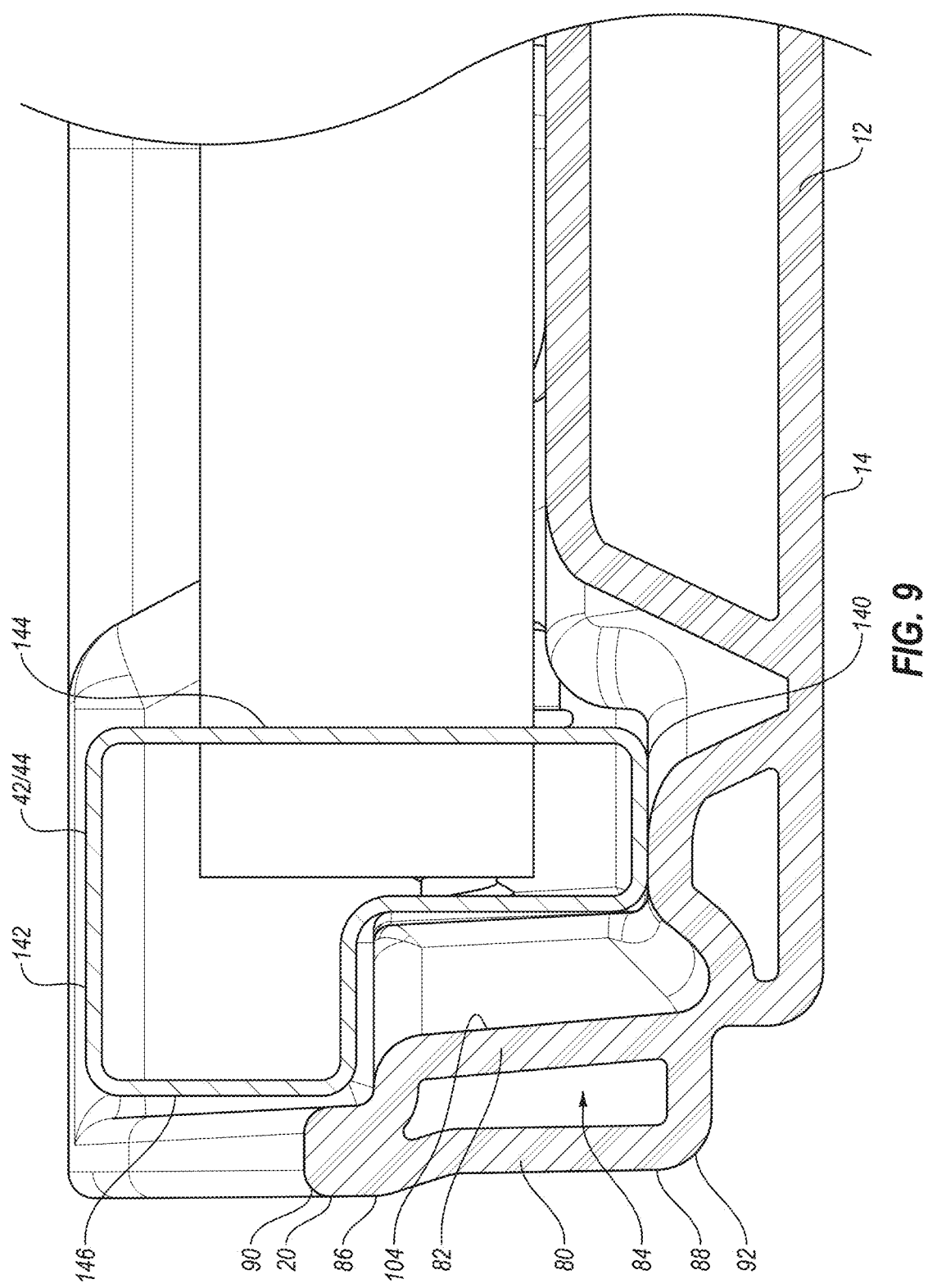
FIG. 9 is a cross-sectional side view of a portion of an exemplary embodiment of a table, illustrating an exemplary configuration of a tabletop, lip, and frame.
Figure 10:
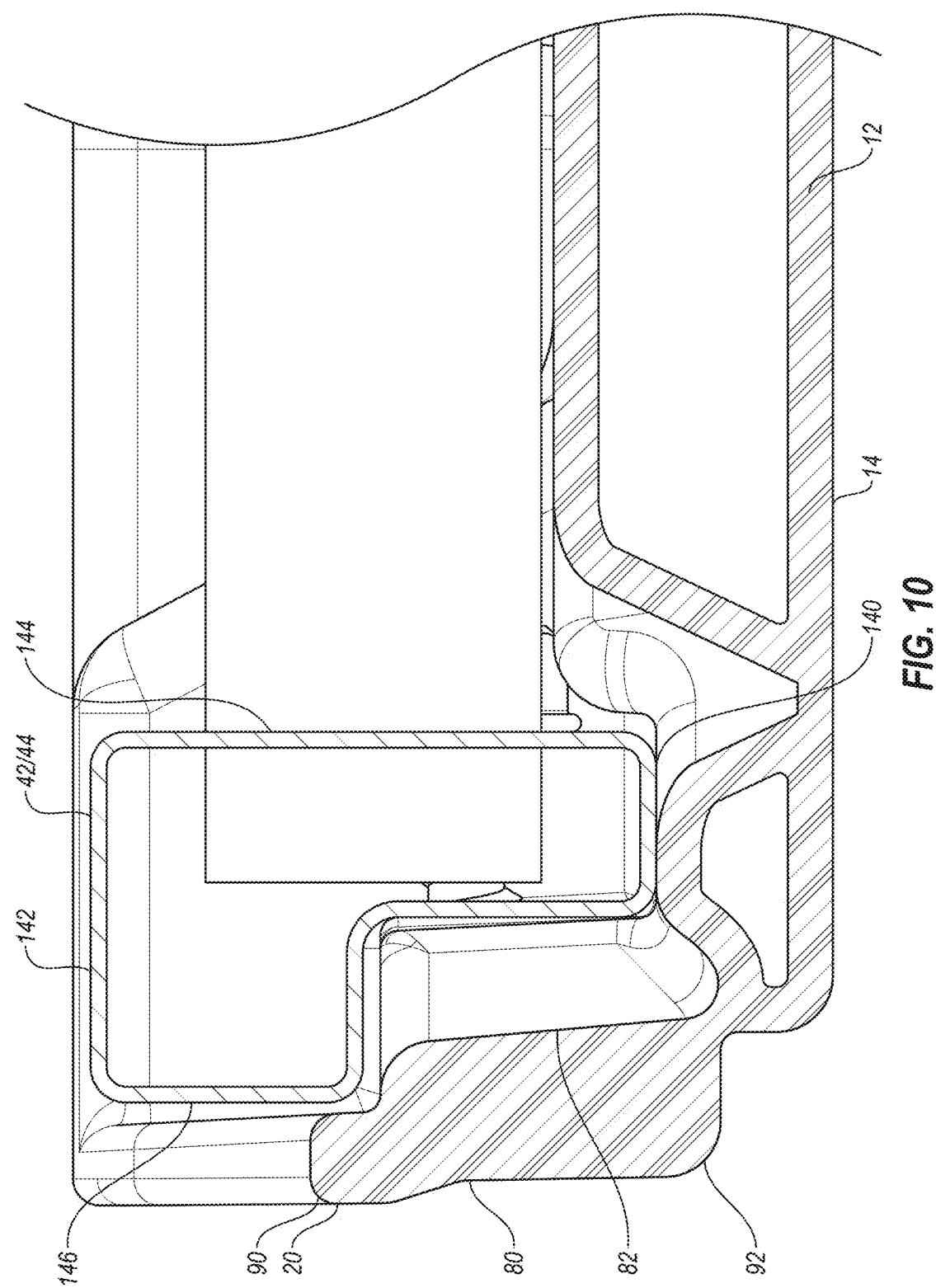
FIG. 10 is a cross-sectional side view of a portion of another exemplary embodiment of a table, illustrating an exemplary configuration of a tabletop, lip, and frame.
Figure 11:
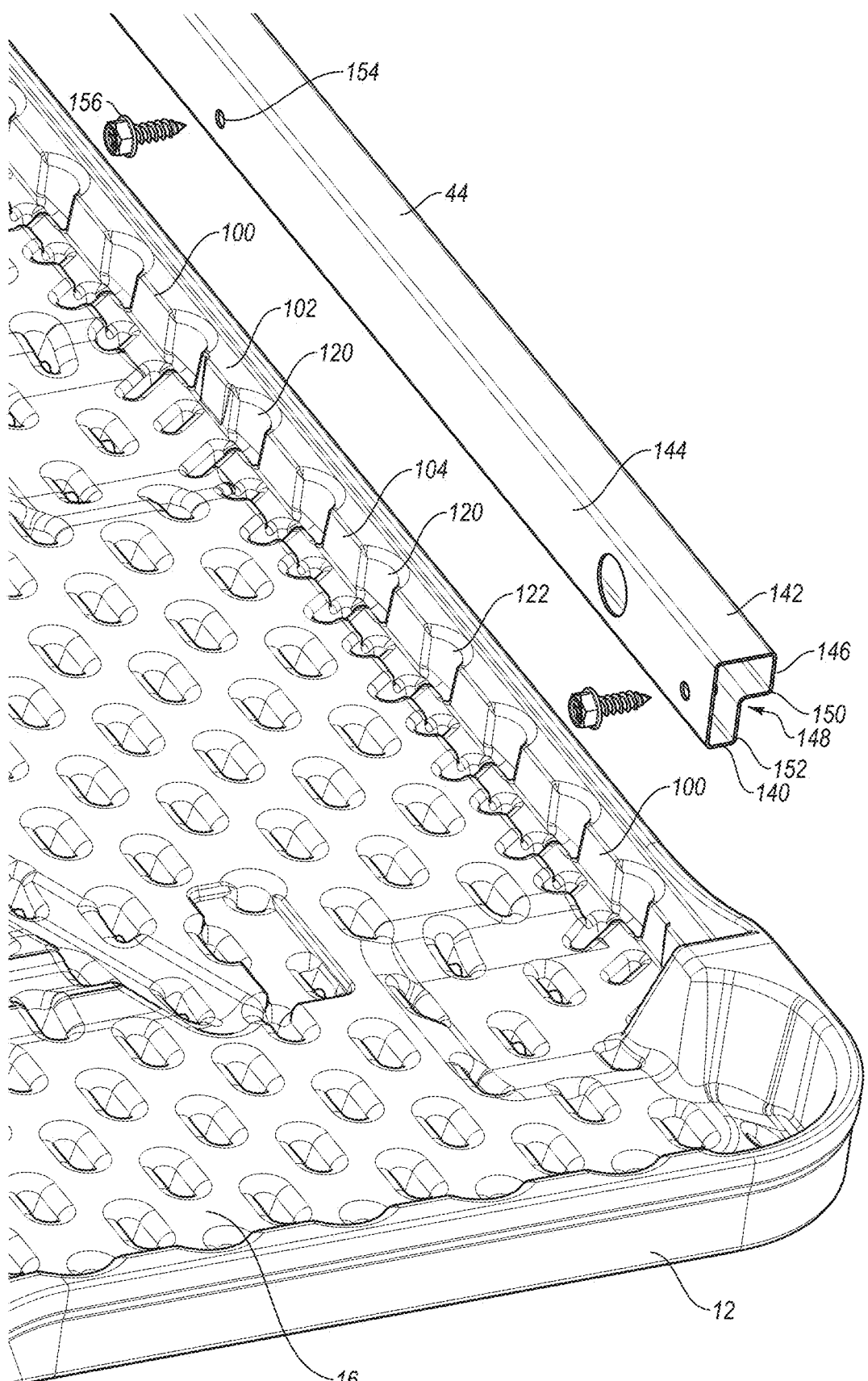
FIG. 11 is an enlarged, partially exploded, perspective view of a portion of an exemplary embodiment of a table, illustrating an exemplary portion of a tabletop, an exemplary side rail of a frame, and exemplary fasteners.
Figure 12:
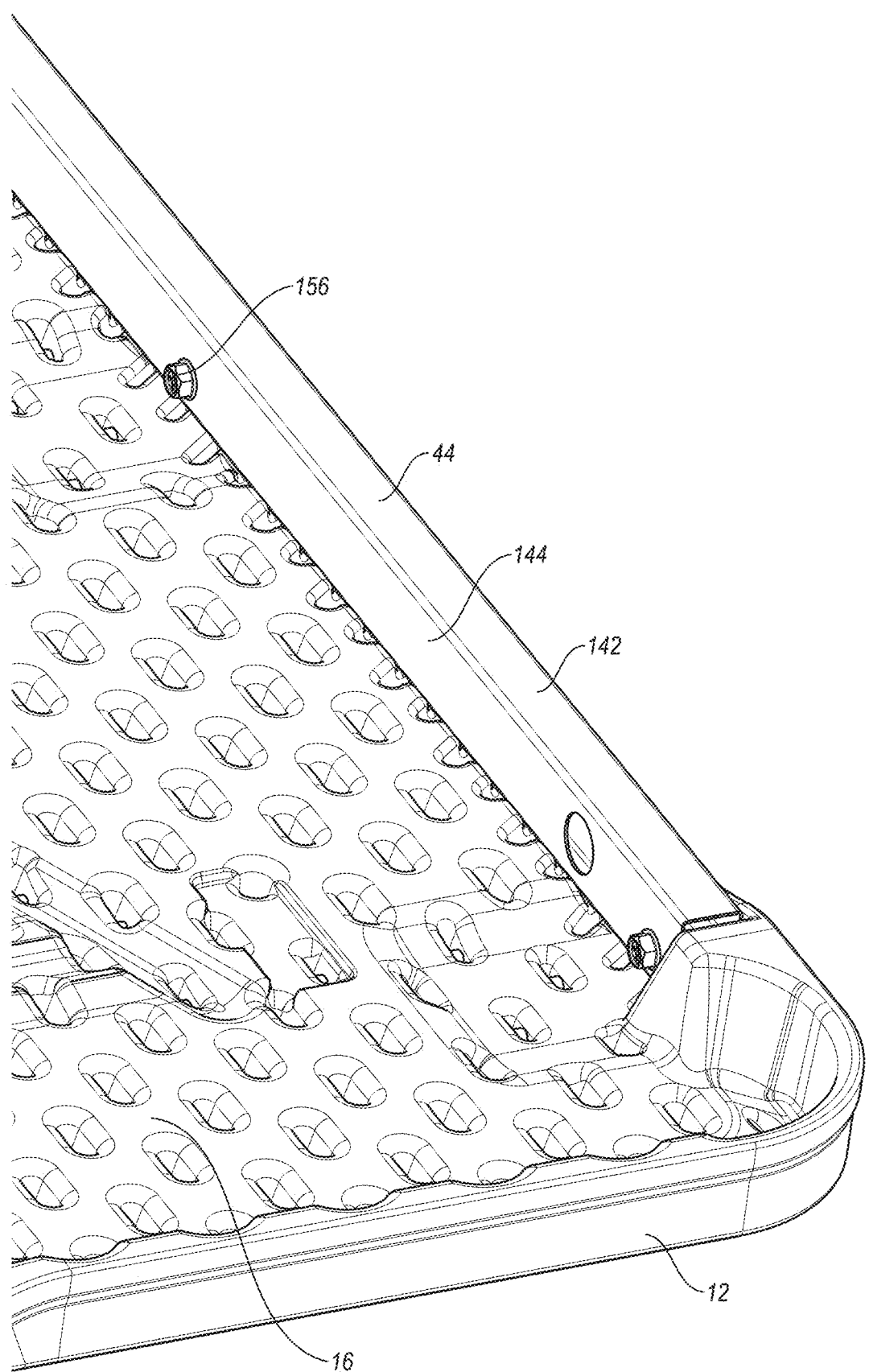
FIG. 12 is an enlarged, perspective view of the portion of an exemplary table shown in FIG. 11, illustrating the side rail of the frame connected to a side of the tabletop.

The lip 20 may include an inner wall 82 that may be disposed generally parallel or at an angle relative to the outer wall 80. A portion of the inner wall 82 and the outer wall 80 may be separated by a spaced or a gap. For example, a hollow interior portion 84 may be at least partially disposed between the inner wall 82 and the outer wall 80, and the hollow interior portion may be formed during the molding process. In particular, the hollow interior portion 84 may be at least partially disposed between the inner wall 82 and the outer wall 80 and the hollow interior portion may be formed during a blow-molding process. A portion of the outer wall 80 and the inner wall 82 of the lip 20 may contact or abut. For example, at least a portion of the outer wall 80 and the inner wall 82 may contact or abut, which may form a compression edge of the tabletop 12. The lip 20 may also include portions in which the outer wall 80 and the inner wall 82 contact or abut, and other portions in which the outer wall 80 and the inner wall 82 are separated by the hollow inter portion 84. For example, the lip 20 may include a first portion 86 in which the outer wall 80 and the inner wall 82 contact or abut and a second portion 88 in which the outer wall and the inner wall are separated by the hollow interior portion 84. In an exemplary embodiment, the first portion 86 may be disposed towards a distal or lower portion 90 of the lip 20 and the second portion 88 may be disposed towards a proximal or upper portion 92 of the lip. Thus, the lower portion 90 of the lip 20 may include a compression edge and an upper portion 92 of the lip may include a hollow interior portion 84, such as shown in FIGS. 8 and 9. In another exemplary embodiment, the outer wall 80 and the inner wall 82 may contact or abut along a height of the lip 20. For instance, the outer wall 80 and the inner wall 82 may contact or abut from the lower portion 90 of the lip 20 to the upper portion 92 of the lip, such as shown in FIG. 10. On the other hand, the outer wall 80 and the inner wall 82 may be separated by the hollow interior portion 84 along the height of the lip. Thus, for example, the outer wall 80 and the inner wall 82 may be separated by the hollow interior portion 84 from the lower portion 90 of the lip 20 to the upper portion 92 of the lip. Therefore, the outer wall 80 and the inner wall 82 of the lip 20 may touch or contact along a height (e.g., measured from the lower portion 90 to the upper portion 92 of the lip) and/or along a length (e.g., measured along a side 22, 24 and/or end 26, 28 of the tabletop 12). In addition, the outer wall 80 and the inner wall 82 may be separated by a distance (e.g., by the hollow interior portion 84) along the height and/or the length of the lip 20. One skilled in the art will appreciate, after reviewing this disclosure, that the lip 20 may include one or more portions in which the outer wall 80 and the inner wall 82 contact or touch, and one or more portions in which the outer wall and the inner wall are separated by a distance, and these portions may be disposed laterally and/or longitudinally along the lip.

Figure 6:
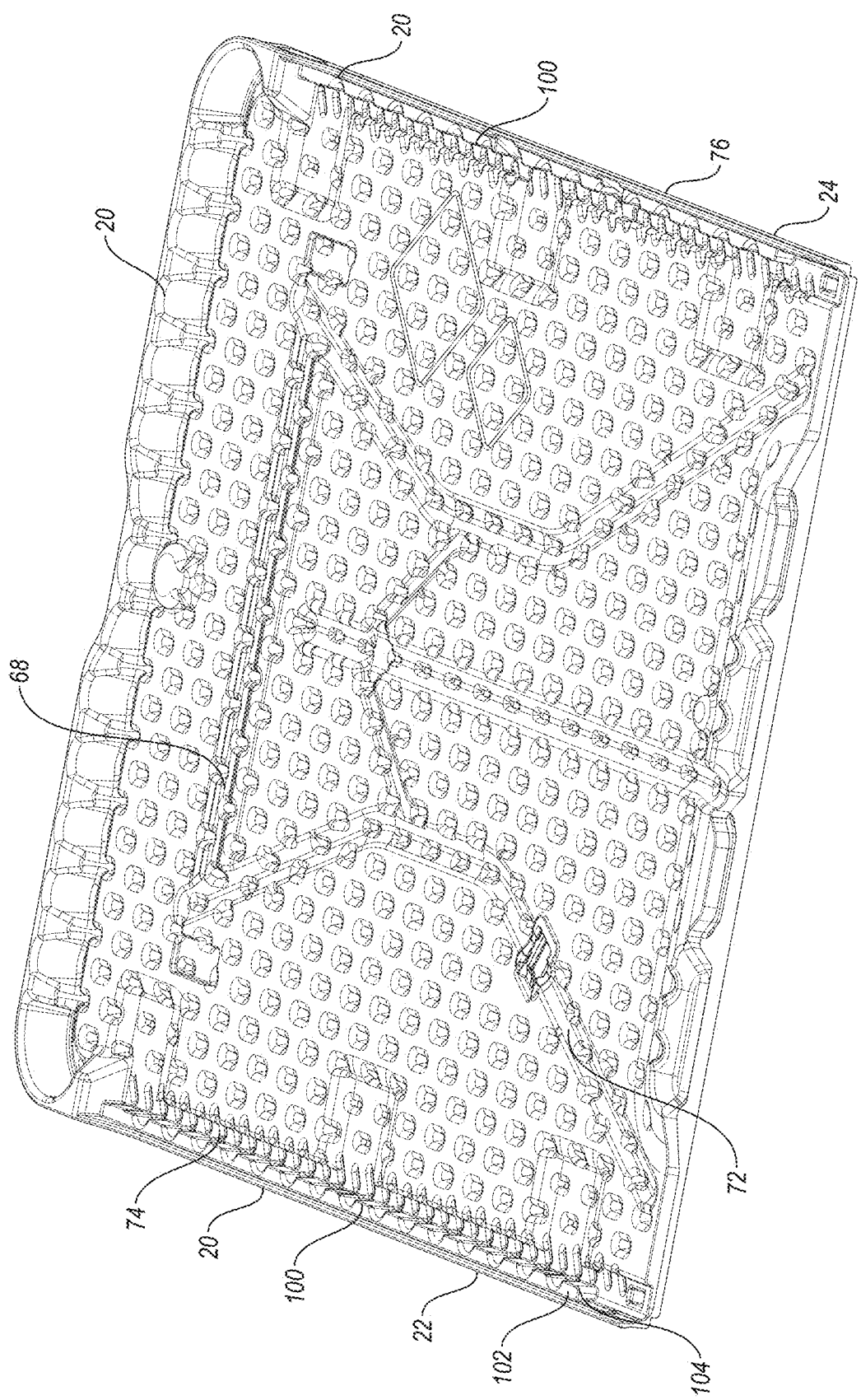
FIG. 6 is an enlarged perspective view of a portion of the tabletop of the exemplary table shown in FIG. 1.

The lip 20 may include one or more inwardly extending portions 100 and these inwardly extending portions may be structural features. For example, as shown in FIG. 6, the inner surface of the lip 20 may include one or more inwardly extending portions 100 and the inwardly extending portions may be disposed along the sides 22, 24 of the tabletop 12. The inwardly extending portions 100 may extend inwardly relative to the inner surface of the lip 20 and the inwardly extending portions may include a lower surface 102 and an inner surface 104. The lower surface 102 of the inwardly extending structures 100 may be disposed substantially parallel to the upper portion 14 and/or the lower portion 16 of the tabletop 12. The inner surface 104 of the inwardly extending portions 100 may be disposed generally parallel to the outer wall 80 and/or inner wall 82 of the lip. The inner surface 104 of the inwardly extending portions 100 may also be disposed generally perpendicular or normal to the upper portion 14 and/or lower portion 16 of the tabletop 12. As shown in the accompanying drawings, the inwardly extending portions 100 may be disposed inwardly relative to the outer wall 80 of the lip 20 and the inwardly extending portions may extend towards a central portion of the tabletop 12.

The inwardly extending portions 100 may be at least partially formed by or disposed in the inner wall 82 of the lip 20. In addition, the inner surface 104 of the inwardly extending structures 100 may be spaced apart from the outer wall 80 by a distance. Thus, a gap, space, or hollow interior portion 106 may be disposed between the inner surface 104 of the structural feature 100 and the outer wall 80 of the lip 20.

If the outer wall 80 and the inner wall 82 are disposed in a generally parallel configuration, the lip 20 may include a lower edge or bottom wall 108, which may connect the outer and inner walls. As discussed above, in an exemplary embodiment, a portion of the outer wall 80 and the inner wall 82 may contact and/or a portion of the outer wall and the inner wall may be separated by a gap or distance. The gap or distance between the outer wall and the inner wall 82 may form the hollow interior portion 84, and the outer and inner walls may be disposed in close proximity. For example, the outer and inner walls 80 and 82 may be spaced apart by about 5 mm (0.2 in.), about 4 mm (0.16 in.), about 3 mm (0.12 in.), about 2 mm (0.08 in.); about 1 mm (0.04 in.), about 0.5 mm (0.02 in.), or less. The outer and inner walls 80 and 82 may provide additional strength and structural rigidity to the lip 20 and/or the inwardly extending structures 100. In addition, the inwardly extending structures 100 may provide additional strength and/or structural rigidity to the lip 20.

The inwardly extending structures 100 may extend along the sides 22, 24 of the tabletop 12 and the inwardly extending structures may be disposed along at least a majority, substantially the entire, or the entire inner wall 82 of the lip 20. For example, the inwardly extending structures 100 may be disposed along more than about fifty percent (50%) of the inner wall 82 along the sides 22, 24 of the tabletop 20, more than about sixty percent (60%) of the inner wall along the sides of the tabletop, more than about seventy percent (70%) of the inner wall along the sides of the tabletop, more than about eighty percent (80%) of the inner wall along the sides of the tabletop, or more than about ninety percent (90%) of the inner wall along the sides of the tabletop.

In an exemplary embodiment, such as shown in FIG. 6, the first frame receiving recess 74 may be disposed along the first side 22 of the tabletop 12 and the second frame receiving recess 76 may be disposed along the second side 24 of the tabletop 12. The inwardly extending portions 100 may extend inwardly towards the frame receiving recesses 74, 76. The lower surface 102 of the inwardly extending portion 100 may be spaced closer to the lower portion 16 of the tabletop 12 than the distal end 90 of the lip 20. Thus, the distal end 90 of the lip 30 may extend farther from the lower portion 16 of the tabletop 12 than the lower surface 102 of the inwardly extending portion 100. The inner surface 104 of the structural feature 100 may be disposed at least proximate the frame receiving recesses 74, 76. For example, the inner surface 104 of the structural feature 100 may be generally aligned with a sidewall 110 of the frame receiving recess 74, 76.

The inwardly extending portions 100 may include one or more strengthening members 120, which may be sized and configured to provide additional strength. The strengthening members 120 may have a generally curved or rounded configuration and may be disposed in the lower surface 102 and/or inner surface 104 of the structural feature. For example, the strengthening members 120 may have a rounded surface 122 that extends towards the outer wall 80 of the lip. If desired, an inner surface 124 of the structural feature 120 may contact the outer wall 80 of the lip. As shown in FIG. 6, the strengthening member 120 may be disposed in both the lower surface 102 and the inner surface 104 of the structural feature 100. After reviewing this disclosure, one skill in the art will appreciate that the strengthening member 120 may have other suitable shapes, sizes, configurations, and/or arrangements depending, for example, upon the intended use of the table 10.

As mentioned above, the inwardly extending portion 100 may include a hollow interior portion 106 and the strengthening members 120 may include a hollow interior portion 126. The hollow interior portions 106 of the inwardly extending portion 100 and/or the hollow interior portion 126 of the strengthening member 120 may be in fluid communication with the hollow interior portion 38 of the tabletop 12 and/or the hollow interior portion 84 of the lip 20. The hollow interior portions 106 and/or 126 may be part of a cavity, chamber, opening, etc. and may be used to create a pathway. For example, the hollow interior portions 106 and/or 126 may be in fluid communication with at least a portion of the hollow interior portion 38 of the tabletop 12 and at least a portion of the lip 20. This may facilitate fluid flow during a molding process, such as a blow-molding process. In particular, the hollow interior portions 106 and/or 126 may allow gas, such as air, to flow between the tabletop 12 and the lip 20 during the molding process.

For example, the hollow interior portions 106 and/or 126 may facilitate gas flow during the blow-molding process so that gas flows into the hollow interior portion 84 of the lip 20, which may help form the lip during the blow-molding process. In particular, the hollow interior portion 84 of the lip 20 may be in fluid communication with the hollow interior portions 106 and/or 126. The hollow interior portions 106 and/or 126 and the hollow interior portion 84 may facilitate formation of the lip 20 during the blow-molding process and may allow the lip to be formed with the hollow interior portion 84 as shown in FIGS. 8 and 9, and/or the solid structure as shown in FIG. 10.

After reviewing this disclosure, it will be appreciated that the inwardly extending portions 100 and the strengthening members 120 may be generally disposed between the frame receiving recess 74, 76 and the lip 20. The inwardly extending portions 100 and the strengthening members 120 may also be disposed in other portions of the tabletop 12. For example, one or more inwardly extending portions 100 may be disposed along the ends 26, 28 of the tabletop 12. In addition, while the lip 20 shown in the accompanying figures extends about the entire perimeter 18 of the tabletop 12, the lip may be disposed about only a portion of the tabletop. Further, the tabletop 20 could include any suitable number of lips 20 and the lips could be separated by a distance. For example, a first lip may be disposed along the first side 22 of the tabletop 12 and a second lip may be disposed along the second side 24 of the tabletop. Additionally, the lip 20 may have different heights. For instance, the lip 20 along the sides 22, 24 may have a height that is different from the height of the lip along the ends 26, 28 of the tabletop. This may allow, for example, a portion of the frame 40 to be exposed. The lip 20 could also have other suitable shapes, sizes, configurations, and/or arrangements, such as that shown in U.S. Pat. No. 9,138,050, which is incorporated by reference in its entirety.

The lip 20, the inwardly extending portions 100, and the strengthening members 120 may be integrally formed as part of a unitary, one-piece structure. In particular, the lip 20, the inwardly extending portions 100, and the strengthening members 120 may be integrally formed with the tabletop 12 as part of a unitary, one-piece structure. For instance, in a blow-molded process, the material that is used to form the tabletop 12 may also create the lip 20, the inwardly extending portions 100, and the strengthening members 120.

Figure 7:
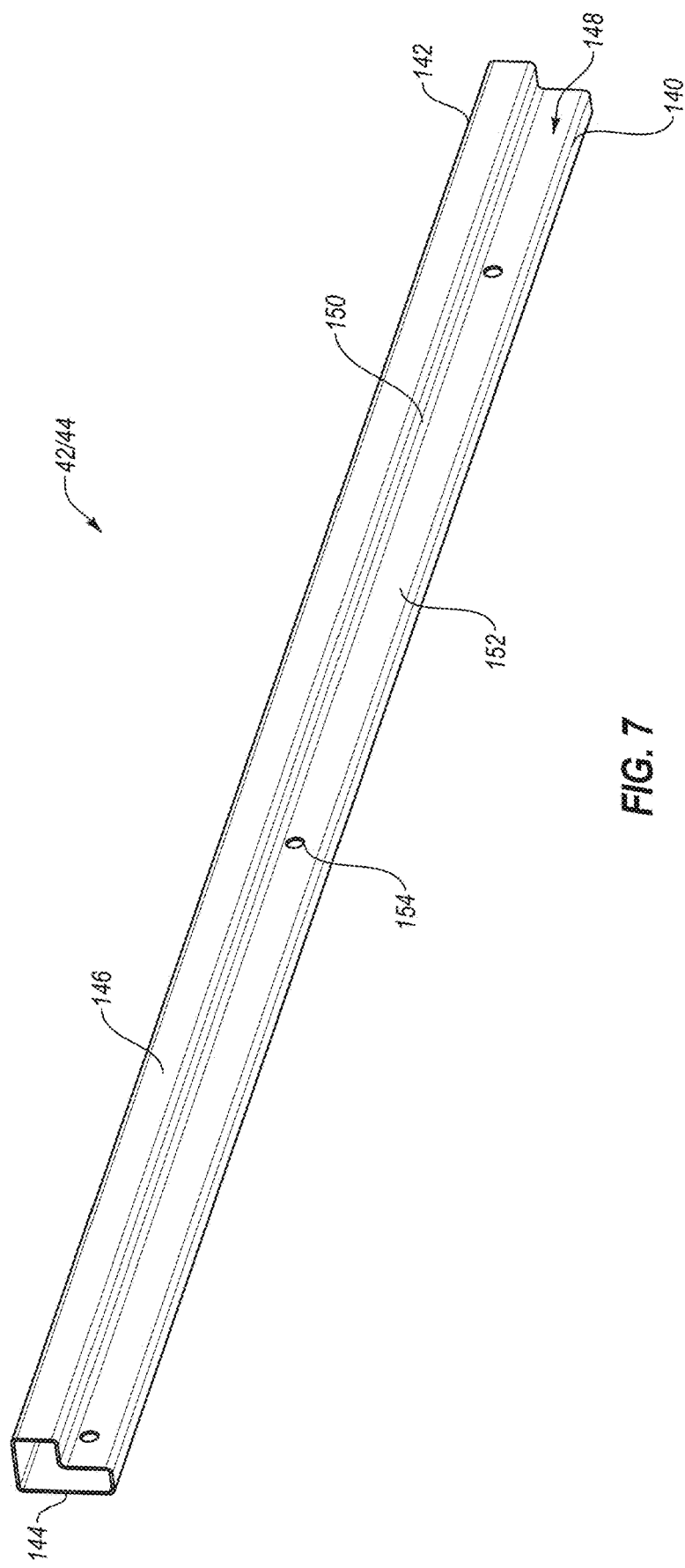
FIG. 7 is an enlarged perspective view of a portion of the frame of the exemplary table shown in FIG. 1.

As shown in FIG. 7, the side rails 42, 44 of the frame 40 may include a first portion 140 and a second portion 142.

The first portion 140 may be referred to as an upper portion and the second portion 142 may be referred to as the lower portion. The first portion 140 may be sized and configured to be disposed in the frame receiving recess 74, 76. Thus, the first portion 140 may be disposed in the frame receiving recess 74, 76 and the second portion 142 may be disposed towards the lower portion of the lip 20. The width of the upper portion 140 may be smaller than the width of the lower portion 142. For example, the width of the upper portion 140 may be generally equal to or less than eighty percent (80%) of the width of the lower portion 142, generally equal to or less than seventy percent (70%) of the width of the lower portion, generally equal to or less than sixty percent (60%) of the width of the lower portion, generally equal to or less than fifty percent (50%) of the width of the lower portion, generally equal to or less than forty percent (40%) of the width of the lower portion, generally equal to or less than thirty percent (30%) of the width of the lower portion, generally equal to or less than twenty percent (20%) of the width of the lower portion, or generally equal to or less than ten percent (10%) of the width of the lower portion. The first and second portions 140, 142 of the side rails 42, 44 of the frame 40 may have a generally planar surface.

The side rails 42, 44 of the frame may include a side 144, which may be referred to as the inner side or surface, disposed towards an inner portion of the tabletop 12 and a side 146, which may be referred to as the outer side or surface, disposed towards an outer portion of the tabletop. The side rails 42, 44 may further include a receiving portion 148 and the receiving portion may be at least partially defined by a first surface 150 and a second surface 152. As shown in the accompanying figures, the receiving portion 148 may have a generally L-shaped configuration with the first and second surfaces 150, 152 disposed at generally a right angle. The receiving portion 148, however, could have other suitable shapes, sizes, configurations, and/or arrangements. The side rails 42, 44 may include one or more openings 154 and the openings may be sized and configured to facilitate attachment of the side rails to the tabletop 12. For example, the openings 154 may be sized and configured to allow fasteners 156 to connect the side rails 42, 44 to the lip 20.

The receiving portion 148 of the side rails 42, 44 may be sized and configured to receive a portion of the lip 20. For example, the receiving portion 148 may be sized and configured to receive an inwardly extending portion of the lip 20. In an exemplary embodiment, the receiving portion 148 may be sized and configured to receive the inwardly extending portions 100. In another exemplary embodiment, the receiving portion 148 may be sized and configured to receive the strengthening members 120. In still another exemplary embodiment, the receiving portion 148 may be sized and configured to receive the inwardly extending portions 100 and the strengthening members 120. The receiving portion 148 may also be sized and configured to receive one or more inwardly extending portions 100 and/or one or more strengthening members 120.

In an exemplary embodiment, the inwardly extending portions 100 may have a height that is less than the height of the lip 20. This may allow the upper portion 140 of the side rails 42, 44 to support the lower portion 16 of the tabletop 12 and the side 146 of the side rails 42, 44 to support the distal end 90 of the lip 20. Thus, the side rails 42, 44 may directly support both the tabletop 12 and the lip 20. In addition, the receiving portion 148 of the side rails 42, 44 may receive the inwardly extending portions 100, which may be necessary to form the lip 20. Thus, the side rails 42, 44 of the frame 40 may enclose or surround the inwardly extending portions 100 and may support both the tabletop 12 and the lip 20.

As shown in the accompanying figures, the inwardly extending portions 100 and the strengthening members 120 may be disposed at least proximate the intersection, connection, or meeting of the body of the tabletop 12 and the lip 20. In particular, the inwardly extending portions 100 and the strengthening members 120 may be connected to the tabletop 12 and the lip 20. In greater detail, the inwardly extending portions 100 and the strengthening members 120 may be connected to the lower portion 16 of the tabletop 12 and the inner surface 82 of the lip 20. In addition, the side rails 42, 44 of the frame 40 may be disposed proximate the intersection, connection, or meeting of the body of the tabletop 12 and the lip 20

As shown in FIGS. 9 and 10, the tabletop 12 may include one or more elongated tack-offs 160. The elongated tack-offs may be similar to the elongated tack-offs disclosed in U.S. patent application Ser. No. 16/192,581, entitle MOLDED PLASTIC STRUCTURES, filed Nov. 15, 2018, which is incorporated by reference in its entirety.

It will be understood the tabletop 12, and parts and components of the tabletop, may have different shapes, sizes, configurations and/or arrangements depending, for example, upon the intended use of the table 10. It will also be understood that the table 10 and tabletop 12 and may include any suitable number and combination of features, aspects, and components; but none of the features, aspects or components may be required. In addition, it will be understood that the inwardly extending structures 100 may have a particular size, shape, configuration, and/or arrangement to provide, for example, increased strength, rigidity, and/or structural integrity. It will be further understood that the inwardly extending structures 100 may have a specific size, shape, configuration and/or arrangement depending, for example, upon factors such as location, intended use, function and the like. Thus, it will be appreciated that the inwardly extending structures 100 may have other shapes, sizes, configurations, and/or arrangements than those described below.

One of ordinary skill in the art may appreciate after reviewing this disclosure that the tables and tabletops disclosed herein may have a number of different aspects, features, characteristics, and configurations. Further, a table and/or tabletop may have any suitable number of aspects, features, characteristics, and configurations depending, for example, upon the intended use of the table. The table and/or tabletop may include one or more of the features, aspects, and/or components described above, and other features, aspects, and/or components, but none of the features, aspects, and/or components may be required.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A blow-molded plastic structure constructed using a blow-molding process, the blow-molded plastic structure comprising:
   a tabletop including an upper surface, a lower surface, and a hollow interior portion disposed between the upper surface and the lower surface of the tabletop;

a lip extending downwardly relative to the lower surface of the tabletop, the lip including an outer surface and an inner surface;
an inwardly extending portion extending inwardly from the inner surface of the lip; and
a frame member comprising:
  an outer wall comprising:
    a receiving portion disposed in an upper portion of the outer wall that extends inwardly and receives the inwardly extending portion of the lip, and
    a lower portion that is disposed at least proximate a lower portion of the inner surface of the lip;
  an inner wall spaced inwardly from the outer wall and separated by a distance; and
  an upper portion that supports the lower surface of the tabletop, the upper portion at least partially disposed between the outer wall and the inner wall;
  wherein the receiving portion of the frame member has a generally L-shaped configuration with a first surface disposed at least proximate a first side of the inwardly receiving portion and a second surface disposed at least proximate a second side of the inwardly receiving portion.

2. The blow-molded plastic structure of claim 1, wherein the inwardly extending portion of the lip is enclosed by the receiving portion in the outer wall of the frame member.

3. The blow-molded plastic structure of claim 1, wherein a fastener extends through the outer wall and the inner wall of the frame member and into the inwardly extending portion of the lip to connect the frame member to the tabletop.

4. The blow-molded plastic structure of claim 1, wherein the inwardly extending receiving portion in the outer wall is disposed towards the upper portion of the frame member;
  wherein a first surface of the receiving portion is disposed generally parallel to the lip; and
  wherein the lower portion of the outer wall is disposed generally parallel to the lip.

5. The blow-molded plastic structure of claim 1, wherein the upper portion of the frame member supports a lower portion of the tabletop; and
  wherein the lower portion of the outer wall of the frame member supports a distal portion of the lip.

6. The blow-molded plastic structure of claim 1, wherein a first wall of the receiving portion of the frame member has a generally planar configuration and is disposed at least proximate a first portion of the inwardly extending portion of the lip; and
  wherein a second wall of the receiving portion of the frame member has a generally planar configuration and is disposed at least proximate a second portion of the inwardly extending portion of the lip.

7. The blow-molded plastic structure of claim 1, wherein the upper portion of the frame member is disposed in a frame receiving recess in the lower surface of the tabletop;
  wherein the receiving portion of the frame member encloses the inwardly extending portion of the lip; and
  wherein the lower portion of the frame member is generally aligned with a lower portion of the lip.

8. The blow-molded plastic structure of claim 1, the frame member further comprising a lower portion;
  wherein the outer wall, the inner wall, the upper portion, and the lower portion of the frame member form an integral, one-piece structure that forms a boundary about an interior volume of the frame member.

9. The blow-molded plastic structure of claim 1, further comprising:
  a first opening in the inner wall of the frame member;
  a second opening in the outer wall of the frame member; and
  a fastener extending through the first opening and the second opening and into the inwardly extending portion to facilitate attachment of the frame member to the tabletop.

10. The blow-molded plastic structure of claim 1, wherein the upper wall of the frame member contacts the lower surface of the tabletop;
  wherein a first surface of the receiving portion of the frame member contacts a first surface of the inwardly extending portion of the lip;
  wherein a second surface of the receiving portion of the frame member contacts a second surface of the inwardly extending portion of the lip; and
  wherein an outer surface of the frame member contacts the inner surface of the lip.

11. A molded plastic structure comprising:
  a tabletop including an upper surface and a lower surface;
  a lip extending downwardly relative to the lower surface of the tabletop, the lip including an outer surface and an inner surface;
  an inwardly extending portion extending inwardly from the inner surface of the lip; and
  a frame member including an outer sidewall with an upper portion and a lower portion, the upper portion of the outer sidewall including an inwardly extending a receiving portion that receives the inwardly extending portion, the lower portion of the outer sidewall disposed at least proximate an inner surface of the lip; the frame member including an upper portion that supports the lower surface of the tabletop, the frame member including an inner sidewall spaced apart from the outer sidewall by a distance;
  wherein the receiving portion of the frame member has a generally L-shaped configuration with a first surface disposed at least proximate a first side of the inwardly receiving portion of the lip and a second surface disposed at least proximate a second side of the inwardly receiving portion of the lip.

12. The molded plastic structure of claim 11, wherein a first portion of the receiving portion contacts a first portion of the inwardly extending portion of the lip; and
  wherein a second portion of the receiving portion contacts a second portion of the inwardly extending portion of the lip.

13. The molded plastic structure of claim 11, wherein a fastener extends through the outer sidewall of the frame member, the inner sidewall of the frame member, and into the inwardly extending portion of the lip to connect the frame member to the tabletop.

14. The molded plastic structure of claim 11, wherein a first portion of the inwardly extending portion has a generally planar surface and a second portion of the inwardly extending portion has a generally planar surface.

15. The molded plastic structure of claim 11, wherein the tabletop, the lip, and the inwardly extending portion are integrally formed as part of a unitary, one-piece structure during a molding process.

16. The molded plastic structure of claim 11, wherein a height of the inwardly extending portion is less than a height of the lip;
  wherein the lower portion of the outer sidewall of the frame member supports a lower portion of the lip; and
  wherein a lower surface of the frame member is generally aligned with a lower portion of the lip.

17. The molded plastic structure of claim 11, wherein the upper portion of the frame member is disposed in a frame receiving recess in the lower surface of the tabletop;
    wherein the receiving portion of the frame member encloses the inwardly extending portion of the lip; and
    wherein a lower portion of the frame member is generally aligned with a lower portion of the lip.

18. The molded plastic structure of claim 11, wherein the outer sidewall, the inner sidewall, the upper portion, and a lower portion of the frame member form an integral, one-piece structure that forms a boundary about an interior volume of the frame member.

19. The molded plastic structure of claim 11, further comprising:
    a first opening in the inner sidewall of the frame member;
    a second opening in the outer sidewall of the frame member; and
    a fastener extending through the first opening and the second opening and connected to the inwardly extending portion of the lip.

20. The molded plastic structure of claim 11, wherein the upper portion of the frame member contacts the lower surface of the tabletop;
    wherein a first surface of the receiving portion of the frame member contacts a first surface of the inwardly extending portion;
    wherein a second surface of the receiving portion of the frame member contacts a second surface of the inwardly extending portion; and
    wherein the lower portion of the outer sidewall of the frame member contacts the inner surface of the lip.

\* \* \* \* \*